(12) United States Patent
Fujii

(10) Patent No.: US 10,859,866 B2
(45) Date of Patent: Dec. 8, 2020

(54) TRANSPARENT SUBSTRATE WITH LIGHT-SHIELDING LAYER

(71) Applicant: AGC INC., Chiyoda-ku (JP)

(72) Inventor: Kensuke Fujii, Tokyo (JP)

(73) Assignee: AGC INC., Chiyoda-ku (JP)

( * ) Notice: Subject to any disclaimer, the term of this patent is extended or adjusted under 35 U.S.C. 154(b) by 154 days.

(21) Appl. No.: 16/277,515

(22) Filed: Feb. 15, 2019

(65) Prior Publication Data
US 2019/0258107 A1     Aug. 22, 2019

(30) Foreign Application Priority Data
Feb. 19, 2018   (JP) .................................. 2018-026793

(51) Int. Cl.
*G02F 1/13*    (2006.01)
*G02F 1/1335*  (2006.01)

(52) U.S. Cl.
CPC ............................. *G02F 1/133512* (2013.01)

(58) Field of Classification Search
CPC ......... G02F 1/133512; G02F 1/133514; G02F 1/133502; H01L 21/0276
See application file for complete search history.

(56) References Cited

FOREIGN PATENT DOCUMENTS

| JP | 2013-178643 | 9/2013 |
|---|---|---|
| JP | 2014-99159 | 5/2014 |
| JP | 2015-5049 | 1/2015 |

OTHER PUBLICATIONS

"Front plate for touch panel, display device including the plate, and integrated sensor substrate comprising front plate for touch panel and touch panel sensor", JP2014099159, machine translation. (Year: 2014).*

* cited by examiner

*Primary Examiner* — Wen Huang
(74) *Attorney, Agent, or Firm* — Oblon, McClelland, Maier & Neustadt, L.L.P.

(57) ABSTRACT

A transparent substrate with a light-shielding layer including: a transparent substrate having a first main surface and a second main surface; an infrared ray-transmitting layer that is on the first main surface and forms a visible light-transmitting region that is an opening in a top view from the first main surface side; and a light-shielding layer that is on the infrared ray-transmitting layer and forms an infrared ray-transmitting region that is an opening to expose the infrared ray-transmitting layer in the top view from the first main surface side.

13 Claims, 11 Drawing Sheets

TRANSPARENT SUBSTRATE WITH LIGHT-SHIELDING LAYER

TECHNICAL FIELD

The present invention relates to a transparent substrate with a light-shielding layer.

BACKGROUND ART

An on-vehicle information apparatus such as a car navigation system or an audio system, or a portable communication apparatus has a display device.

In the display device, a protective cover which is a transparent substrate is provided on a front surface of a display panel through an adhesive layer (Patent Literature 1). The protective cover has a function of reducing reflection of external light or protecting the display panel from external impact. A light-shielding layer is, for example, provided in a frame shape, on the display panel side surface of the protective cover. The light-shielding layer has a function of hiding wirings on the display panel side or hiding illumination light of a backlight to thereby prevent the illumination light from leaking from the circumference of the display panel, as well as a function of keeping fine view of the display device.

The light-shielding layer may be partially opened to transmit visible light (Patent Literature 2). For example, an opening portion with a shape corresponding to characters, figures or symbols constituting a logo mark of a product is provided in the light-shielding layer so that the logo mark can be displayed in the opening portion only when illumination light of the display device is on.

The light-shielding layer may be partially opened to transmit infrared rays (Patent Literature 3). For example, there is a case where a part of the light-shielding layer is opened to form an opening portion, and an infrared ray-transmitting layer which is higher in transmittance with respect to infrared rays than the light-shielding layer and as high in transmittance with respect to visible light as the light-shielding layer is provided in the opening portion. Then, the opening portion serves as a window for infrared communication.

An on-vehicle information apparatus or a portable communication apparatus may perform communication or object detection using electromagnetic waves out of the wavelength range of visible light, such as infrared rays. In the case where communication or object detection using infrared rays is performed, an infrared sensor and an infrared ray-transmitting layer provided in the display portion may be obstacles to the display and may spoil the appearance. In the case where a part of the light-shielding layer is opened to provide the infrared ray-transmitting layer therein, the infrared sensor can be provided on the back side of the light-shielding layer, and the infrared ray-transmitting layer can be made inconspicuous.

Patent Literature 1: JP-A-2015-5049
Patent Literature 2: JP-A-2013-178643
Patent Literature 3: JP-A-2014-99159

SUMMARY OF INVENTION

As in Patent Literature 3, in the case where a part of the light-shielding layer is opened to provide therein an infrared ray-transmitting layer having a similar color to that of the light-shielding layer, the infrared ray-transmitting layer can be made inconspicuous to some extent.

However, there is a case where it is difficult to make the infrared ray-transmitting layer similar in color to the light-shielding layer.

Such a case may occur due to a difference in transmittance with respect to infrared rays between the light-shielding layer and the infrared ray-transmitting layer. In addition, in the case where ink is applied and baked to form the light-shielding layer and the infrared ray-transmitting layer, it may be insufficient to take only the color into consideration because physical properties such as hardness and adhesion to the display panel are also required.

When perfect compatibility cannot be established between the color and the physical properties required in the light-shielding layer and the infrared ray-transmitting layer, priority may be given to the physical properties. Thus, there is a possibility that the desired color cannot be obtained.

In the case where the desired color cannot be obtained, a difference in color between the light-shielding layer and the infrared ray-transmitting layer may be conspicuous, spoiling the appearance.

An object of the present invention is to provide a transparent substrate with a light-shielding layer in which a difference in color between the light-shielding layer and an infrared ray-transmitting layer is hardly noticeable.

A transparent substrate with a light-shielding layer including: a transparent substrate having a first main surface and a second main surface; an infrared ray-transmitting layer that is on the first main surface and forms a visible light-transmitting region that is an opening in a top view from the first main surface side; and a light-shielding layer that is on the infrared ray-transmitting layer and forms an infrared ray-transmitting region that is an opening to expose the infrared ray-transmitting layer in the top view from the first main surface side, in which: the light-shielding layer includes a region having a width of 100 μm to 1,000 μm, surrounding an inner circumference of the visible light-transmitting region and contacting with the first main surface in a top view from the second main surface side; the infrared ray-transmitting region has a luminous transmittance of 0.1% to 50% measured from the second main surface side with respect to a light having a wavelength of 380 nm to 780 nm, and has the minimum transmittance of 70% or higher measured from the second main surface side with respect to a light having a wavelength of 800 nm to 1,000 nm; and an overlapping region where the transparent substrate, the infrared ray-transmitting layer, and the light-shielding layer overlap with one another in the top view from the second main surface side has an optical density of 4 or more in OD value measured from the second main surface side.

According to the present invention, the infrared ray-transmitting layer which sufficiently shields visible light but sufficiently transmits infrared rays and the light-shielding layer which sufficiently shields either of visible light and infrared rays are provided on the first main surface of the transparent substrate in this order.

Therefore, viewed from the second main surface side, the infrared ray-transmitting layer can be seen in front even in the region where the light-shielding layer is provided. Thus, the difference in color between the infrared ray-transmitting region where only the infrared ray-transmitting layer is provided and the region where the light-shielding layer is provided can be made inconspicuous.

In addition, according to the present invention, the circumference of the visible light-transmitting region is surrounded by the light-shielding layer. Thus, the visible light-transmitting region and the infrared ray-transmitting layer are separated by the light-shielding layer so as to be prevented from contacting with each other.

Therefore, even in the case where the infrared ray-transmitting layer is provided in front when viewed from the second main surface side, the visible light-transmitting region is surrounded by the light-shielding layer so that the circumference of the visible light-transmitting region can be prevented from being blurred.

In the present invention, a semitransparent layer may be provided in the visible light-transmitting region, and the visible light-transmitting region may have a luminous transmittance of 10% to 50% measured from the second main surface side with respect to the light having the wavelength of 380 nm to 780 nm, and may have the maximum transmittance of lower than 70% measured from the second main surface side with respect to the light having the wavelength of 800 nm to 1,000 nm.

According to an aspect of the present invention, the semitransparent layer which sufficiently shields infrared rays but can transmit visible light to some extent may be provided in the visible light-transmitting region.

Therefore, even in the case where intensity of light incident from the first main surface side is high, intensity of light transmitted through the visible light-transmitting region can be relaxed.

In the present invention, the visible light-transmitting region may be a region having a shape corresponding to a character, a figure or a symbol in the top view from the second main surface side.

According to an aspect of the present invention, the visible light-transmitting region may be a region which is partially opened in a shape corresponding to a character, a figure or a symbol. Therefore, in the case where the shape of the region is formed into a shape corresponding to a logo mark or the like of a product, the logo mark or the like can be displayed in the visible light-transmitting region only when light is incident from the first main surface side.

In the present invention, the transparent substrate may be a chemically strengthened glass.

According to an aspect of the present invention, the transparent substrate may be a chemically strengthened glass. It is therefore possible to provide the transparent substrate with a light-shielding layer, which is excellent in strength and excoriation resistance and which also has a good quality.

In the present invention, the transparent substrate may be a bent glass.

According to an aspect of the present invention, the transparent substrate may be a bent glass. Therefore, even in the case where a member on which the transparent substrate with a light-shielding layer should be mounted has a bent shape, mounting accuracy is not likely to be lowered.

In the present invention, an antiglare layer may be provided on the second main surface side.

According to an aspect of the present invention, the antiglare layer may be provided on the second main surface side. Therefore, light incident from the second main surface side can be scattered to blur glare caused by the incident light.

In the present invention, the antiglare layer may be an etching layer or a coating layer.

According to an aspect of the present invention, in the case where the antiglare layer is an etching layer, it is advantageous in that coating with another material for antiglare is not necessary. In the case where the antiglare layer is a coating layer, it is advantageous in that antiglare property of the antiglare layer can be controlled easily in accordance with a selection of a material thereof.

In the present invention, a surface roughness of the antiglare layer may be 0.01 μm to 0.5 μm in root mean square roughness.

According to an aspect of the present invention, the surface roughness of the antiglare layer may be 0.01 μm to 0.5 μm in root mean square roughness. Therefore, light incident from the second main surface side can be scattered more surely.

In the present invention, an antireflection layer may be provided on the second main surface side.

According to an aspect of the present invention, the antireflection layer may be provided on the second main surface side. Therefore, reflection of light incident from the second main surface side can be prevented, and glare caused by the incident light can be prevented.

In the present invention, the antireflection layer may include a laminated structure of a high-refractive index layer having a refractive index of 1.9 or higher with respect to a light having a wavelength of 550 nm and a low-refractive index layer having a refractive index of 1.6 or lower with respect to the light having the wavelength of 550 nm.

According to an aspect of the present invention, the antireflection layer may include the structure where the high-refractive index layer and the low-refractive index layer are laminated. Therefore, reflection of visible light can be prevented more surely.

In the present invention, the antireflection layer may have an a* of −6 to 1 and a b* of −8 to 1 in the CIE color difference system.

According to an aspect of the present invention, the antireflection layer may be −6 to 1 in a* and −8 to 1 in b*. Therefore, the antireflection layer is not likely to be a "danger" color (warning color). Thus, the color of the antireflection layer can be prevented from being conspicuous.

In the present invention, an antifouling layer may be provided on the second main surface side.

According to an aspect of the present invention, the antifouling layer may be provided on the second main surface side. Therefore, even if a finger of a human being touches the second main surface, adhesion of dirt such as a fingerprint, sebum, or sweat thereto can be reduced.

In the present invention, the overlapping region may have a ratio of an average reflectivity with respect to a light having a wavelength of 600 nm to 700 nm to an average reflectivity with respect to a light having a wavelength of 400 nm to 600 nm being 1.5 or more.

According to an aspect of the present invention, the overlapping region may have the ratio of the average reflectivity being 1.5 or more. Therefore, the difference in color between the overlapping region and the infrared ray-transmitting region can be reduced more.

DESCRIPTION OF EMBODIMENTS

An embodiment of the present invention will be described below with reference to the drawings.

Configuration of Transparent Substrate with Light-Shielding Layer:

First, a configuration of a transparent substrate with a light-shielding layer according to an embodiment of the present invention will be described with reference to FIGS. 1 to 3.

Figure 1:
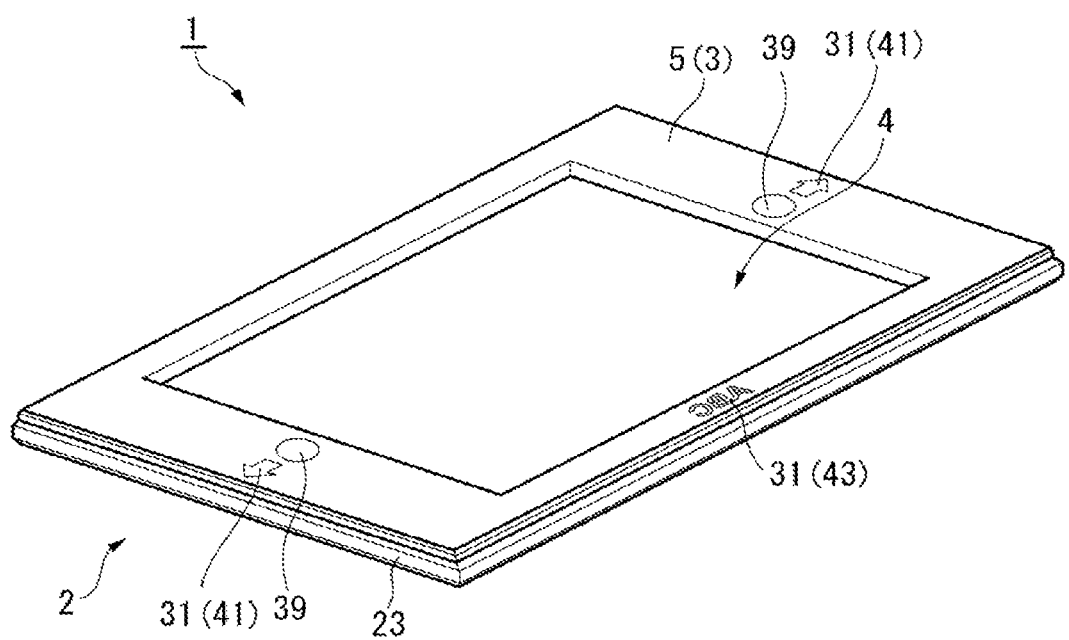
FIG. 1 is a perspective view illustrating a transparent substrate with a light-shielding layer according to an embodiment of the present invention.
Figure 2A:
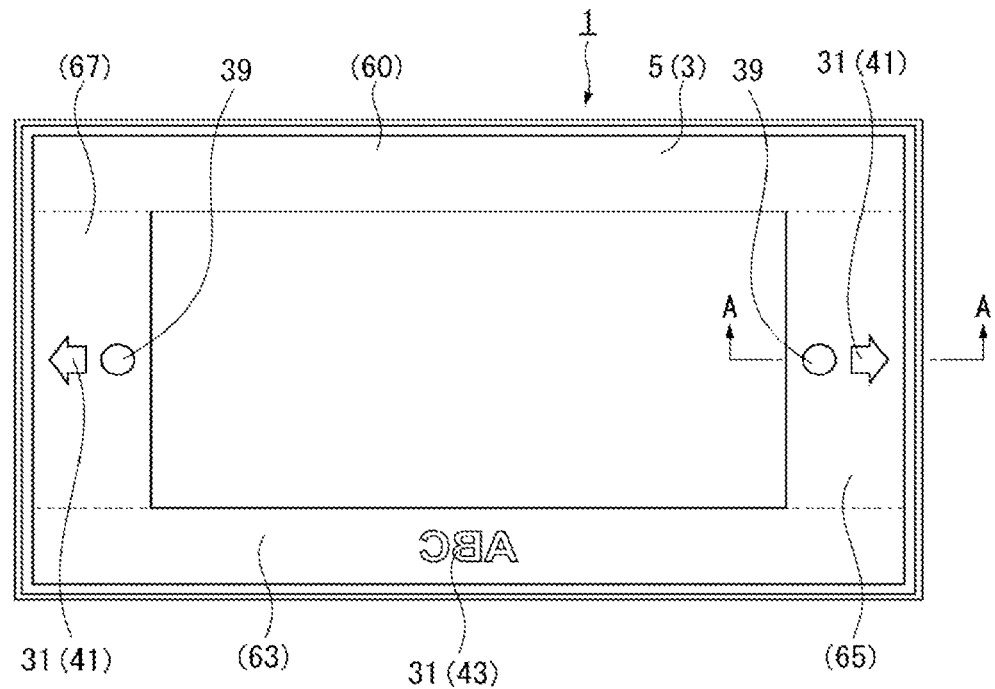
FIG. 2A is a plan view illustrating a transparent substrate with a light-shielding layer according to an embodiment of the present invention.
Figure 2B:
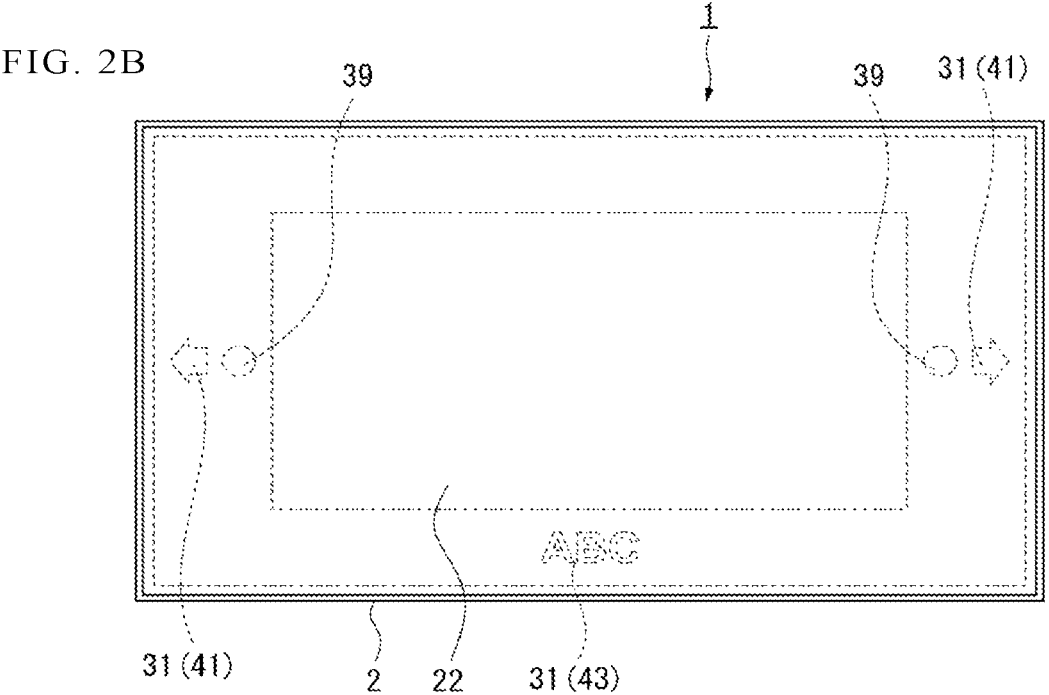
FIG. 2B is a back view of FIG. 2A.
Figure 3:
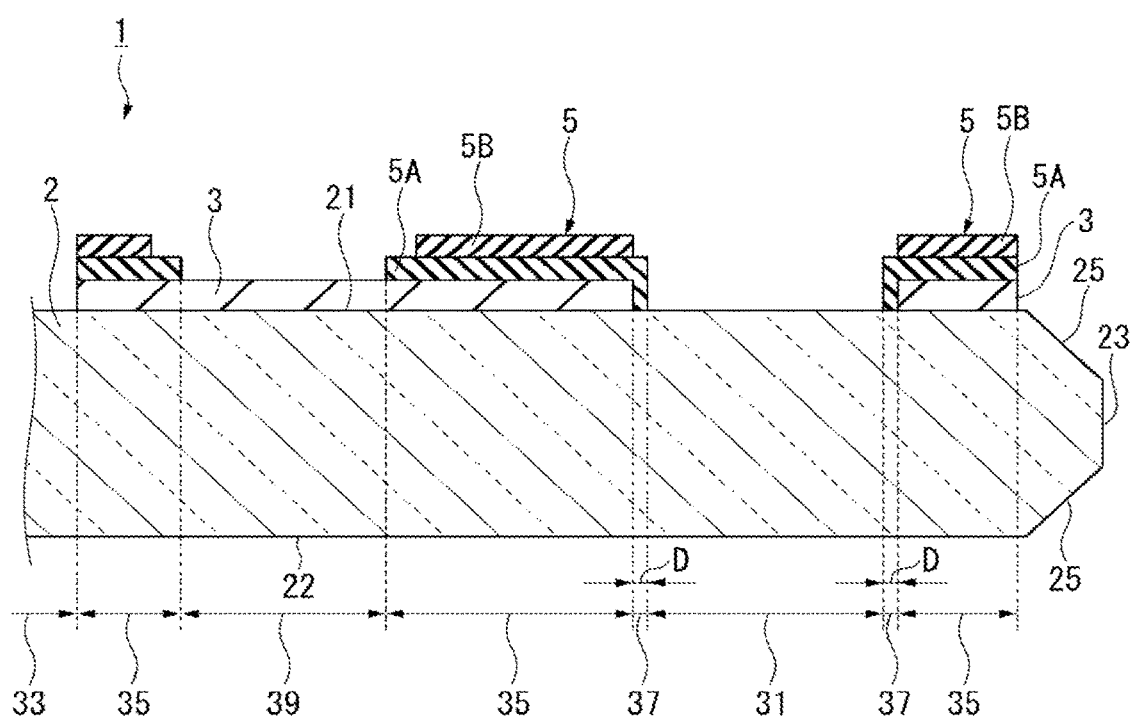
FIG. 3 is a sectional end view taken on cutting line A-A in FIG. 2A.

A transparent substrate with light-shielding layer 1 illustrated in FIGS. 1 to 3 has a transparent substrate 2, an infrared ray-transmitting layer 3 and a light-shielding layer 5.

The transparent substrate 2 is a transparent member having a rectangular shape in planar view and made of a material through which visible light can be transmitted. The transparent member here means a member having a luminous transmittance of 85% or higher with respect to light having a wavelength of 380 nm to 780 nm. The luminous transmittance means an average transmittance weighted by visibility and light intensity of a light source within a measuring wavelength range. Specifically, from a transmission spectrum measured by a spectrophotometer, the luminous transmittance can be derived according to JIS Z 8722:2009. The same definition can be applied to the following description. As illustrated in FIG. 3, the transparent substrate 2 has a first main surface 21, a second main surface 22 and an end face 23. Chamfered portions 25 are provided in the end face 23. The transparent substrate 2 is preferably made of a material which is excellent in strength and excoriation resistance and has a good quality. As such a material, a glass or particularly a chemically strengthened glass can be exemplified.

The infrared ray-transmitting layer 3 is provided to give a light shielding property and an infrared ray transmitting property to the transparent substrate with light-shielding layer 1. The infrared ray-transmitting layer 3 is lower in visible light transmittance than the transparent substrate 2, but is at least as high in infrared ray transmittance as the transparent substrate 2.

In the embodiment, the infrared ray-transmitting layer 3 has a quadrangular frame shape and is provided on a peripheral edge portion of the first main surface 21 of the transparent substrate 2.

As illustrated in FIG. 3, a part of the infrared ray-transmitting layer 3 forming the frame is opened to partially expose the first main surface 21 in top view from the first main surface 21 side. In the transparent substrate with light-shielding layer 1, a region inside the opened part is referred to as a visible light-transmitting region 31. In addition, a region inside the quadrangular frame is referred to as a display region 33.

The thickness of the infrared ray-transmitting layer 3 is preferably 1 μm or more and 10 μm or less, and more preferably 2 μm or more and 5 μm or less. In the case where the thickness is not less than the lower limit value, unevenness of transmittance is hard to occur. In the case where the thickness is not more than the upper limit value, film separation between the layer and another layer due to stress is hard to occur. Thus, when the transparent substrate with light-shielding layer 1 is bonded on a liquid crystal panel, an "air line" caused by residual air hardly appears in a step portion.

The refractive index of the infrared ray-transmitting layer 3 is preferably close to that of the transparent substrate 2. In the case where a glass is, for example, used as the transparent substrate 2, the difference |n1−n2| between a refractive index n1 of the glass and a refractive index n2 of the infrared ray-transmitting layer 3 is preferably 0.3 or less, and more preferably 0.2 or less. In the case where the difference is within this range, reflectivity of the region where the infrared ray-transmitting layer 3 and the light-shielding layer 5 overlap with each other can be sufficiently reduced. The refractive index indicates the real part of a refractive index at a wavelength of 550 nm.

The light-shielding layer 5 is provided to give a light shielding property to the transparent substrate with light-shielding layer 1. The light-shielding layer 5 is provided to overlap with the infrared ray-transmitting layer 3 and contact with the first main surface 21 so as to surround the inner circumference of the visible light-transmitting region 31, in top view from the second main surface 22 side. In FIG. 3, the light-shielding layer 5 has a structure in which a first light-shielding layer 5A and a second light-shielding layer 5B are laminated.

In the following description, the region where the transparent substrate 2, the light-shielding layer 5 and the infrared ray-transmitting layer 3 overlap with one another will be referred to as a light-shielding region 35. The region where the light-shielding layer 5 surrounds the inner circumference of the visible light-transmitting region 31 will be referred to as an inner circumference-surrounding region 37.

The light-shielding layer 5 is partially opened to expose the infrared ray-transmitting layer 3 in top view from the first main surface 21 side. In the transparent substrate with light-shielding layer 1, a region inside the opening part is referred to as an infrared ray-transmitting region 39.

The light-shielding layer 5 is lower both in transmittance of visible light and in transmittance of infrared rays than the transparent substrate 2.

The thickness of the light-shielding layer 5 is preferably 1 μm or more and 10 μm or less, and more preferably 2 μm or more and 5 μm or less. In the case where the thickness of the light-shielding layer 5 is not less than the lower limit value, unevenness of transmittance is hard to occur. In the case where the thickness of the light-shielding layer 5 is not more than the upper limit value, film separation between the layer and another layer due to stress is hard to occur. Thus, when the transparent substrate with light-shielding layer 1 is bonded on a liquid crystal panel, an "air line" caused by residual air hardly appears in a step portion.

In this manner, in the transparent substrate with light-shielding layer 1, the infrared ray-transmitting layer 3 and the light-shielding layer 5 are laminated on the transparent substrate 2 in the predetermined order and with predetermined shapes so as to provide the light-shielding region 35, the infrared ray-transmitting region 39, the visible light-transmitting region 31, the inner circumference-surrounding region 37, and the display region 33.

The light-shielding region 35 is a region for hiding members provided on the first main surface 21 side or hides light incident from the first main surface 21 side. In the case where the transparent substrate with light-shielding layer 1 is, for example, a protective cover for a display panel, the light-shielding region 35 hides wirings or hides illumination light of a backlight so as to prevent the illumination light from leaking from the circumference of the display panel. The light-shielding region 35 has to have an optical property of shielding visible light and infrared rays sufficiently. Specifically, the optical density of the light-shielding region 35 has to be 4 or more in OD value measured from the second main surface 22 side. The OD value is preferably 4.2 or more, and more preferably 4.5 or more.

The optical density (OD value) here is an absolute value of a value in which a ratio of a transmitted light quantity Ta of light transmitted through an object to be measured with respect to an incident light quantity I of the light is expressed by the logarithm to base 10 as shown in Equation (A). The optical density (OD value) shows hiding performance. The same definition can be applied to the following description.

$$\text{OD value}=|\text{Log}_{10}(Ta/I)| \qquad (A)$$

In Equation (A), setting the incident light quantity I of visible light having a wavelength of 360 nm to 830 nm to be 1,000 and the transmitted light quantity Ta to be 1, the OD value is $|\text{Log}_{10}(1/1000)|=3$.

In the light-shielding region 35, a ratio of average reflectivity (average value of reflectivity) with respect to light having a wavelength of 600 nm to 700 nm to average reflectivity with respect to light having a wavelength of 400 nm to 600 nm is preferably 1.5 or more.

In the case where the ratio of the average reflectivity is not less than the lower limit value, the difference in color between the light-shielding region 35 and the infrared ray-transmitting region 39 can be reduced. The ratio of the average reflectivity is preferably 2 or more, more preferably 2 or more and 10 or less, and even more preferably 2 or more and 3 or less. In the case where the ratio of the average reflectivity is not more than the upper limit value, redness of the light-shielding region 35 can be suppressed to provide an excellent design property. Incidentally, the reflectivity used here is a value expressed as reflectivity RD at the interface between the infrared ray-transmitting layer 3 and the transparent substrate 2 as will be described later.

The reflectivity can be obtained as follows.

[1] A value of reflectivity measured from the second main surface 22 side of the transparent substrate 2 with respect to light incident on the visible light-transmitting region 31 is set as reflectivity RA. The light calculated as the reflectivity RA includes light reflected on the surface (second main surface 22) of the transparent substrate 2, and light passing through the inside of the transparent substrate 2, reflected between the transparent substrate 2 and the air on the first main surface 21 side and then emitted from the second main surface 22 side of the transparent substrate 2 again. In the case where an antireflection film or the like is not provided on the surface of the transparent substrate 2, the reflectivity of the second main surface 22 of the transparent substrate 2 is equal to the reflectivity between the transparent substrate 2 and the air on the first main surface 21 side. Those values are set as reflectivity RB. In this case, the reflectivity RA and the reflectivity RB satisfy the following relational equation. The reflectivity RB is calculated from the measured value of the reflectivity RA based on the following calculation equation.

$$\text{reflectivity } RA = \text{reflectivity } RB + \text{reflectivity } RB(1-\text{reflectivity } RB)^2 \qquad (1)$$

[2] Further, a measured value of reflectivity with respect to light incident on the light-shielding region 35 from the second main surface 22 side is set as reflectivity RC. In addition, in the light-shielding region 35, reflectivity in the interface between the infrared ray-transmitting layer 3 and the transparent substrate 2 is set as reflectivity RD. Light calculated as the reflectivity RD includes light reflected on the interface between the transparent substrate 2 and the infrared ray-transmitting layer 3, and light reflected on the interface between the infrared ray-transmitting layer 3 and the light-shielding layer 5. The reflectivity RB, the reflectivity RC and the reflectivity RD satisfy the following relational equation. The reflectivity RD is calculated from the reflectivity RB obtained by Equation (1), and the reflectivity RC obtained as an analyzed value. The reflectivity RD is regarded as reflectivity of the light-shielding region 35.

$$\text{reflectivity } RC = \text{reflectivity } RB + \text{reflectivity } RD(1-\text{reflectivity } RB)^2 \qquad (2)$$

The infrared ray-transmitting region 39 is a region that sufficiently shields visible light but sufficiently allows infrared rays to pass therethrough. In the case where the transparent substrate with light-shielding layer 1 is, for example, a protective cover for a display panel, the infrared ray-transmitting region 39 is a region serving as a window for infrared communication or for a human sensor. In the case where the transparent substrate with light-shielding layer 1 is a protective cover used in a display panel provided with a illumination light, the infrared ray-transmitting region 39 illustrated in FIG. 2B cannot be visually recognized by a user regardless of whether the illumination light of the display panel is on or not. Therefore, in the case where the display panel has an infrared camera and an infrared sensor is provided on the back side (the first main surface 21 side) of the infrared ray-transmitting region 39, the infrared ray-transmitting region 39 can hide the infrared sensor from a user while serving as a window for communication or for object detection using infrared rays through the infrared ray-transmitting region 39.

The infrared ray-transmitting region 39 has to have an optical property of sufficiently shielding visible light but sufficiently allowing infrared rays to pass therethrough. Specifically, the luminous transmittance measured from the second main surface 22 side with respect to light having a wavelength of 380 nm to 780 nm has to be 0.1% to 50%. The luminous transmittance with respect to light having a wavelength of 380 nm to 780 nm is more preferably 0.8% to 25%. The minimum value of transmittance measured from the second main surface 22 side with respect to light having a wavelength of 800 nm to 1,000 nm has to be 70% or higher. The minimum value of the transmittance with respect to light having a wavelength of 800 nm to 1,000 nm is more preferably 75% or higher.

The minimum value of transmittance with respect to light having a wavelength of 800 nm to 1,000 nm means the minimum value of transmittance with respect to infrared rays. Specifically, a transmission spectrum is measured by a spectrophotometer to obtain the minimum value of transmittance in the spectrum with respect to light having a wavelength of 800 nm to 1,000 nm. The maximum value can be also obtained in the same manner. The same definition can be applied to the following description.

The visible light-transmitting region 31 is a region that can transmit visible light. In the case where the transparent substrate with light-shielding layer 1 is, for example, a protective cover for a display panel, the visible light-transmitting region 31 has a planar shape corresponding to characters, a figure or a symbol as illustrated by the reference numerals 41 and 43 in FIG. 1. In the case where the transparent substrate with light-shielding layer 1 is a protective cover for a display panel, a user can visually recognize the characters, figure or symbol displayed in the visible light-transmitting region 31 illustrated in FIG. 2B only when the illumination light of the display panel is on.

For example, the reference numeral 41 in FIG. 1 represents an arrow sign blinking in accordance with an operating direction when a direction indicator of a car is operated. Alternatively, the reference numeral 41 represents an arrow sign blinking when a hazard switch is pushed. For example, the reference numeral 43 represents a logo mark of a manufacturer or a seller of the display panel.

The display region 33 is a region which can transmit visible light. In the case where the transparent substrate with light-shielding layer 1 is, for example, a protective cover for a display panel, the display region 33 corresponds to a display portion of the display panel.

Figure 8:
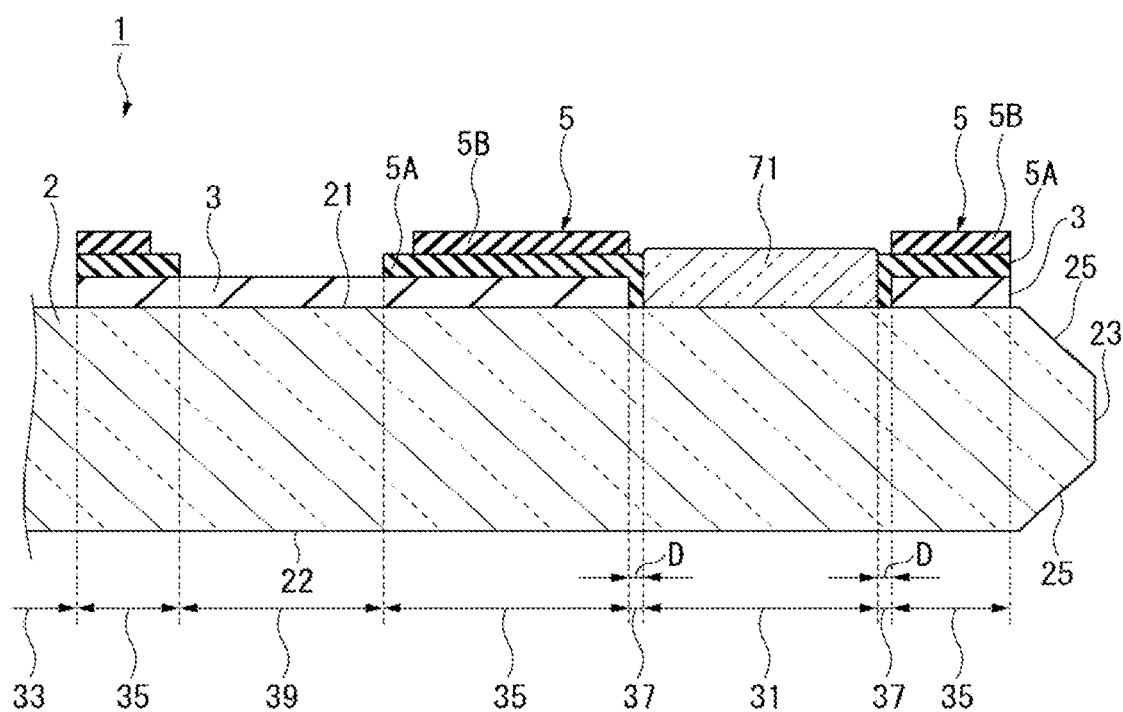
FIG. 8 is a sectional end view illustrating a transparent substrate with a light-shielding layer according to a modification embodiment of the present invention.

In the visible light-transmitting region 31, a semitransparent layer 71 may be provided (FIG. 8).

The semitransparent layer 71 is a layer having an optical property to transmit visible light to some extent. Specifically, the luminous transmittance measured from the second main surface side with respect to light having a wavelength of 380 nm to 780 nm is preferably 10% or higher and 50% or lower, and more preferably 20% or higher and 40% or lower. In the case where the luminous transmittance of the semitransparent layer 71 is 10% or higher, the visible light-transmitting region 31 can be visually recognized even if a light source behind the semitransparent layer 71 has low luminance. In the case where the luminous transmittance of the semitransparent layer 71 is 50% or lower, a sense of unity can be kept between the visible light-transmitting region 31 and a black portion adjacent thereto. Further, it is possible to prevent the light source on the back surface from being seen through.

Further, the maximum value of transmittance measured from the second main surface 22 side with respect to light having a wavelength of 800 nm to 1,000 nm is preferably lower than 70%.

The inner circumference-surrounding region 37 is a region that separates the infrared ray-transmitting layer 3 and the visible light-transmitting region 31 (semitransparent layer 71) from each other. The inner circumference-surrounding region 37 is formed of the light-shielding layer 5.

The inner circumference-surrounding region 37 has a width D (thickness) of 100 µm or more and 1,000 µm or less in the surface direction illustrated in FIG. 3.

In the case where the width D is not less than the lower limit value, the outline of the visible light-transmitting region 31 can be surely surrounded by the light-shielding layer 5, so that the outline of the inner circumference of the visible light-transmitting region 31 can be made clear.

In the case where the width D is not more than the upper limit value, the difference in color between the inner circumference-surrounding region 37 and the infrared ray-transmitting layer 3 can be prevented from being conspicuous. Thus, the inner circumference-surrounding region 37 can be prevented from looking like it traces the outline of the visible light-transmitting region 31 in black.

The width D is preferably 150 µm or more and 500 µm or less, and more preferably 200 µm or more and 400 µm or less.

Method for Manufacturing Transparent Substrate with Light-Shielding Layer:

Next, a method for manufacturing the transparent substrate with light-shielding layer 1 will be described with reference to FIGS. 2A to 2B, FIG. 3, and FIGS. 4A to 4C.

Figure 4A:
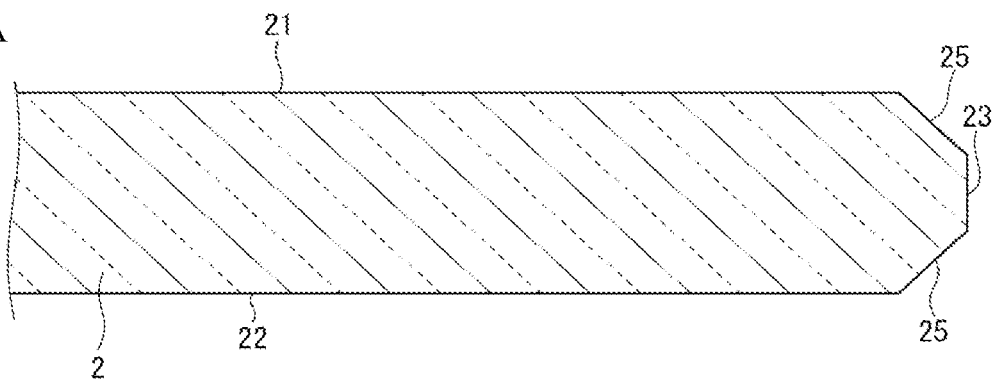
FIGS. 4A to 4C are sectional end views for explaining a method for manufacturing a transparent substrate with a light-shielding layer according to an embodiment of the present invention.

First, a transparent substrate such as a glass substrate is cut into a determined size, and chamfered to prepare the transparent substrate 2 as illustrated in FIG. 4A. On this occasion, it is preferable that the chamfering is performed to set the size of the chamfered portion 25 at 0.05 mm or more and 0.5 mm or less in planar view. After the chamfering, a chemical strengthening is performed if necessary.

Figure 4B:
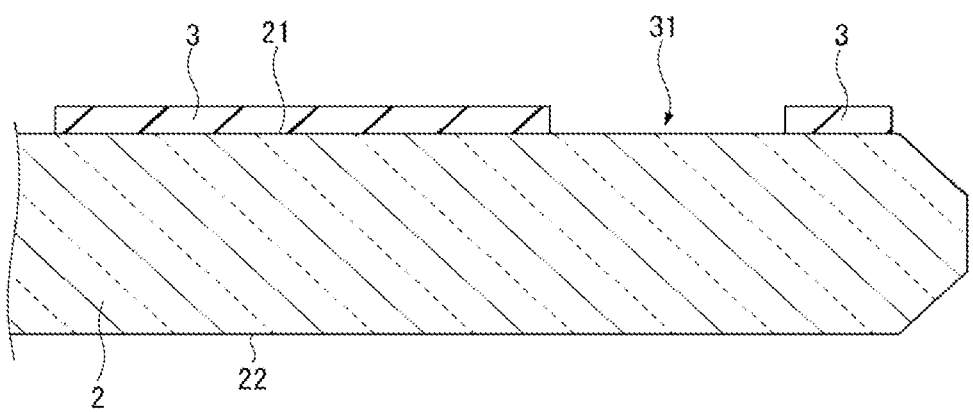

Next, as illustrated in FIG. 4B, the infrared ray-transmitting layer 3 is formed on the transparent substrate 2.

A method for forming the infrared ray-transmitting layer 3 is not particularly limited. Examples of the forming method include a bar coating method, a reverse coating method, a gravure coating method, a die coating method, a roll coating method, a screen method, and an inkjet method. The screen method or the inkjet method is preferred in consideration of easiness to control the thickness.

In the case where the screen method is used, a screen printing sheet to be used is constituted by a mesh portion through which ink can permeate and an emulsion portion which suppresses the permeation of the ink. In this case, the formation regions and/or sizes of the mesh portion and the emulsion portion are controlled so that the infrared ray-transmitting layer 3 can be formed in a desired region.

The mesh size of the screen printing sheet is preferably 15 µm or more and 35 µm or less. In addition, a squeezing speed is preferably 50 mm/s or higher and 200 mm/s or lower, and more preferably 100 mm/s or higher and 200 mm/s or lower. Further, the film thickness of the infrared ray-transmitting layer 3 is preferably 1 µm or more and 10 µm or less. By printing under such conditions, the infrared ray-transmitting layer 3 can be formed with quality causing no problem when it catches the eyes of users.

When the inkjet method is used, micro-droplets of ink in a liquid state are ejected in a pulsed manner from a nozzle to form a pattern on the transparent substrate 2. The transparent substrate 2 is positioned with reference to the starting point of a nozzle moving mechanism. Then, based on an instruction from a computer, the nozzle moves substantially horizontally on the surface of the transparent substrate 2 while ejecting micro-droplets of ink. Thus, dots of the ink are continuously formed to form the infrared ray-transmitting layer 3 with a predetermined pattern. In the case where the transparent substrate 2 has a bent portion in its surface to be printed thereon, it is preferable that the distance between the nozzle ejecting the droplets of the ink and the transparent substrate 2 is substantially constant, in consideration of distortion in the pattern. For example, it is preferable to use a mechanism for rotating and moving the nozzle or the transparent substrate 2 in accordance with the pattern to be printed while keeping the distance between the nozzle and the transparent substrate 2 substantially constant. Incidentally, it is more preferable to use a mechanism for rotating and moving the transparent substrate 2 relatively to the nozzle while fixing the nozzle because in this way, pressure for feeding the ink to the nozzle is stabilized so that the quantity of the ink ejected from the nozzle can be kept constant.

Typically in the inkjet method, the pattern is formed with the nozzle moved linearly in one direction. Therefore, in the case where the infrared ray-transmitting layer 3 has a frame shape as illustrated in FIG. 2A, it is preferable that the infrared ray-transmitting layer 3 is divided into four straight line shaped patterns of an upper side infrared ray-transmitting layer 60, a lower side infrared ray-transmitting layer 63, a right side infrared ray-transmitting layer 65, and a left side infrared ray-transmitting layer 67, and printing is performed individually for the four straight line shaped patterns accordingly.

Specifically, the transparent substrate 2 is mounted on a not-illustrated support table so that an ejection hole of the nozzle is positioned in a right lower end portion of the first main surface 21 of the transparent substrate 2 in FIG. 2A. After that, the nozzle is relatively moved to the left lower end portion while ejecting ink from the ejection hole. Thus, the lower side infrared ray-transmitting layer 63 illustrated in FIG. 2A is printed.

Next, at least one of the support table and the nozzle is moved relatively to position the ejection hole in the right upper end portion in the first main surface 21. After that, the nozzle is relatively moved to the left upper end portion while ejecting ink from the ejection hole. Thus, the upper side infrared ray-transmitting layer 60 illustrated in FIG. 2A is printed.

Next, the ejection hole of the nozzle is positioned in the right upper end portion of the first main surface 21 of the transparent substrate 2 in FIG. 2A. After that, the nozzle is relatively moved to the right lower end portion while ejecting ink from the ejection hole. Thus, the right side infrared ray-transmitting layer 65 illustrated in FIG. 2A is printed.

Next, at least one of the support table and the nozzle is moved relatively to position the ejection hole in the left upper end portion in the first main surface 21. After that, the nozzle is relatively moved to the left lower end portion while ejecting ink from the ejection hole. Thus, the left side infrared ray-transmitting layer 67 illustrated in FIG. 2A is printed.

When the infrared ray-transmitting layer 3 is printed, printing is performed with a printing pattern formed not to print on a part corresponding to the visible light-transmitting region 31, or printing is performed after masking the part corresponding to the visible light-transmitting region 31.

The thickness of the infrared ray-transmitting layer 3 can be adjusted by control of the quantity of ink ejected from the ejection hole or the moving speed of the nozzle. In order to increase the thickness, the quantity of the ejected ink may be increased, or the moving speed may be reduced. In order to decrease the thickness, the quantity of the ejected ink may be reduced, or the moving speed may be increased.

In the present embodiment, it is preferable that the upper side infrared ray-transmitting layer 60, the lower side infrared ray-transmitting layer 63, the right side infrared ray-transmitting layer 65, and the left side infrared ray-transmitting layer 67 have the same thickness, and the printing conditions (the quantity of the ejected ink and the moving speed of the nozzle) are the same among those layers.

After that, drying and baking are performed to harden the infrared ray-transmitting layer 3.

The upper side infrared ray-transmitting layer 60, the lower side infrared ray-transmitting layer 63, the right side infrared ray-transmitting layer 65, and the left side infrared ray-transmitting layer 67 may be dried and baked individually when they are formed, or together after all the layers have been formed.

Figure 4C:
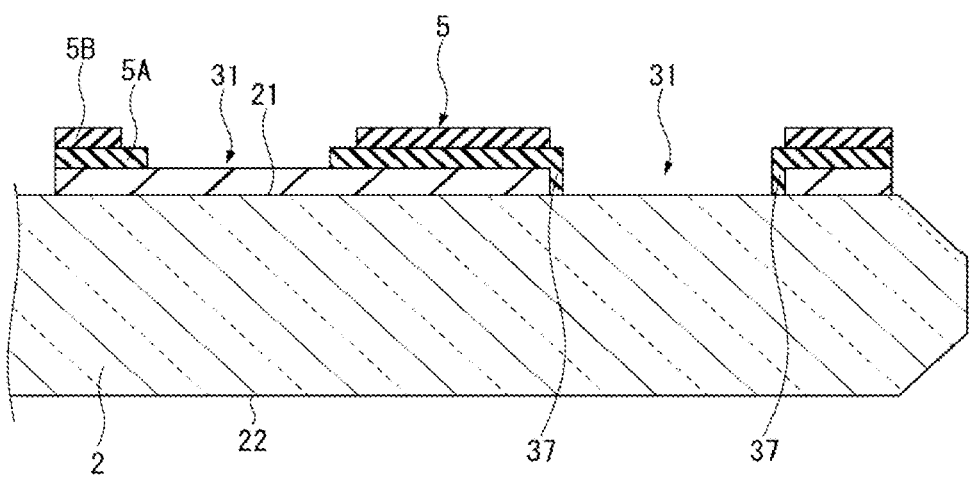

Next, as illustrated in FIG. 4C, the light-shielding layer 5 is formed on the infrared ray-transmitting layer 3.

A method for forming the light-shielding layer 5 is not particularly limited, but it is preferable to use the same method as the method for forming the infrared ray-transmitting layer 3, in consideration of continuity in manufacturing process.

When the light-shielding layer 5 is printed, printing is performed with a printing pattern formed not to print on a part corresponding to the infrared ray-transmitting region 39, or printing is performed after masking the part corresponding to the infrared ray-transmitting region 39. In addition, the printing width is adjusted so that the inner circumference-surrounding region 37 can be formed.

Next, the semitransparent layer 71 is formed on the visible light-transmitting region 31 if necessary.

A method for forming the semitransparent layer 71 is not particularly limited, but it is also preferable to use the same method as the method for forming the infrared ray-transmitting layer 3, in consideration of continuity in manufacturing process.

Through the above steps, the transparent substrate with light-shielding layer 1 can be obtained.

Effect of Transparent Substrate with Light-Shielding Layer:

The infrared ray-transmitting layer 3 which sufficiently shields visible light but sufficiently transmits infrared rays and the light-shielding layer 5 which sufficiently shields either of the visible light and the infrared rays are provided on the first main surface 21 of the transparent substrate 2 in this order.

Therefore, when viewed from the second main surface 22 side, the infrared ray-transmitting layer 3 can be seen on the front side even in a region where the light-shielding layer 5 is provided. Accordingly, the difference in color is inconspicuous between the infrared ray-transmitting region 39 where only the infrared ray-transmitting layer 3 is provided and the light-shielding region 35 where the light-shielding layer 5 is also provided in addition to the infrared ray-transmitting layer 3.

Since the inner circumference of the visible light-transmitting region 31 is covered with the light-shielding layer 5, the visible light-transmitting region 31 is circumferentially surrounded by the light-shielding layer 5 so as to be prevented from contacting with the infrared ray-transmitting layer 3.

Thus, even in the case where the infrared ray-transmitting layer 3 is provided on the front side viewed from the second main surface 22 side, the circumference of the visible light-transmitting region 31 can be prevented from being blurred.

The semitransparent layer 71 which transmits visible light to some extent but sufficiently shields infrared rays is provided in the visible light-transmitting region 31. Accordingly, even in the case where the intensity of light incident from the first main surface 21 side is high, the intensity of light transmitted through the visible light-transmitting region 31 can be relaxed.

The visible light-transmitting region 31 is a region which is partially opened into shapes corresponding to characters, a figure, or a symbol. Accordingly, if the visible light-transmitting region 31 is formed into a shape corresponding to a logo mark or the like, the logo mark or the like can be displayed in the visible light-transmitting region 31 only when light is incident from the first main surface 21 side.

Since the transparent substrate 2 is a chemically strengthened glass, the transparent substrate with light-shielding layer 1 can be provided to be excellent in strength and excoriation resistance and to have a good quality.

In the light-shielding region 35, the ratio of the average reflectivity with respect to light having a wavelength of 600 nm to 700 nm to the average reflectivity with respect to light having a wavelength of 400 nm to 600 nm is 1.5 or more. Accordingly, the difference in color between the light-shielding region 35 and the infrared ray-transmitting region 39 is smaller.

Modifications:

The present invention is not limited to only the aforementioned embodiment, but various improvements, design changes, etc. can be made without departing from the gist of the present invention. Specific procedure, structure, etc. for carrying out the present invention may be replaced by another structure etc. as long as the object of the present invention can be attained.

As the transparent substrate 2, a substrate having various shapes and made of various materials can be used in accordance with the application.

Figure 5:
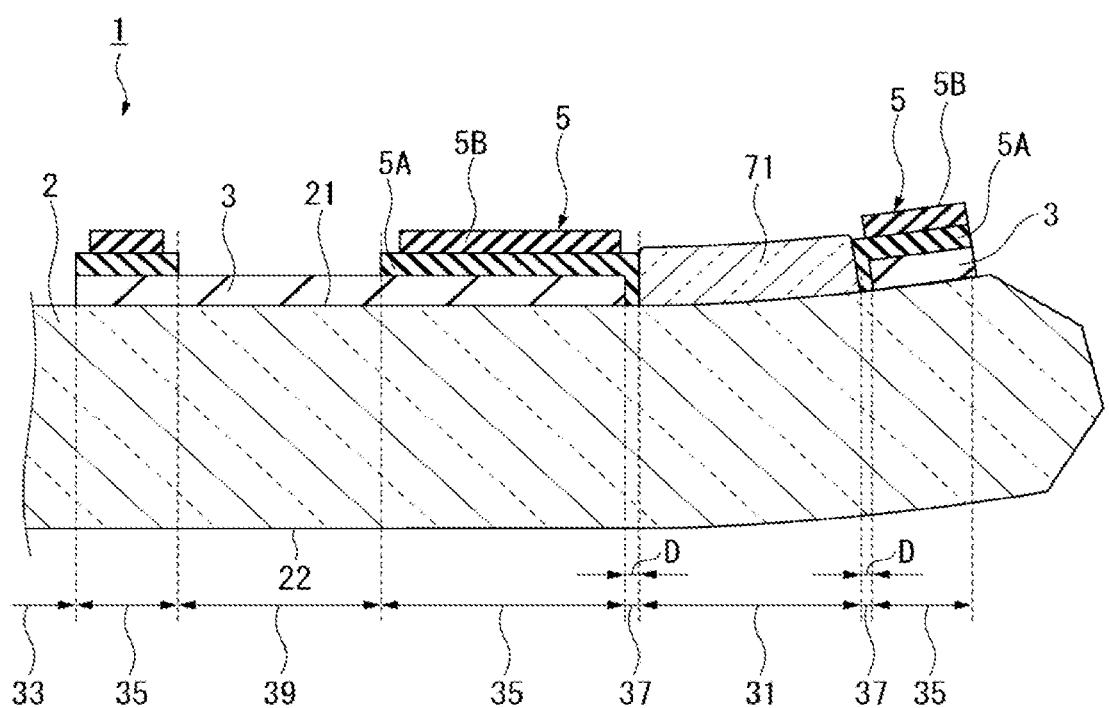
FIG. 5 is a sectional end view illustrating a transparent substrate with a light-shielding layer according to a modification embodiment of the present invention.

As for the shape, the transparent substrate 2 may be, for example, a substrate having a curved face at least partially or a substrate having a recess portion as well as a substrate having only flat faces. In the case where the transparent substrate 2 is, for example, made of glass, it may be a bent glass as illustrated in FIG. 5. In the case where a bent glass is used as the transparent substrate 2, the mounting accuracy is not likely to be lowered even if a member on which the transparent substrate with light-shielding layer 1 is mounted has a bent shape. Further, the transparent substrate 2 may have a film shape. The transparent substrate 2 may have a hole portion, or may have a region partially cut out.

Any material may be used as the material of the transparent substrate 2 as long as it is transparent. A general glass, for example, an inorganic glass or an organic glass such as polycarbonate or acrylic glass may be used. Another synthetic resin or the like may be also used.

In the case where an inorganic glass is used as the transparent substrate 2, the thickness thereof is preferably 0.5 mm or more and 5 mm or less. In the case where the glass has the thickness not less than the lower limit value, there is an advantage that the transparent substrate with light-shielding layer 1 can be obtained with high strength and good quality. In the case where the glass has thickness not more than the upper limit value, the mass of the transparent substrate 2 can be reduced for weight saving. Further, when a touch panel is disposed between the transparent substrate 2 and a display panel, sensitivity can be secured in the touch panel. In addition, in the case where an inorganic glass is used, the thickness thereof is more preferably 0.7 mm or more and 3 mm or less, and even more preferably 1 mm or more and 3 mm or less.

Specifically, the glass substrate may be a chemically strengthened glass in which a transparent and colorless soda lime glass, aluminosilicate glass ($SiO_2$—$Al_2O_3$—$Na_2O$ glass) or lithium aluminosilicate glass has been subjected to a strengthening treatment.

For example, the glass substrate may be made of a glass material containing 50% to 80% of $SiO_2$, 1% to 20% of $Al_2O_3$, 6% to 20% of $Na_2O$, 0 to 11% of $K_2O$, 0 to 15% of MgO, 0 to 6% of CaO, and 0 to 5% of $ZrO_2$ in terms of mol % based on oxides. Specifically, a strengthened glass in which an aluminosilicate glass has been subjected to a strengthening treatment (for example, "Dragontrail®") can be used preferably.

In the case where an inorganic glass is used as the transparent substrate 2, either of a chemical strengthening treatment or a physical strengthening treatment may be performed thereon. However, the chemical strengthening treatment is preferred. The chemical strengthening treatment is suitable for strengthening a comparatively thin inorganic glass as described above. It is preferable that a compressive stress layer is formed in the surface of the glass substrate by the chemical strengthening. The thickness of the compressive stress layer is preferably 10 μm or more, more preferably 15 μm or more, even more preferably 25 μm or more, and particularly preferably 30 μm or more. In addition, surface compressive stress in the compressive stress layer is preferably 650 MPa or more, and more preferably 750 MPa or more.

As a method for forming the compressive stress layer on the glass substrate, the following method may be used. That is, the glass substrate is dipped in $KNO_3$ molten salt, and subjected to an ion exchange process (chemical strengthening treatment). After that, the glass substrate is cooled down to the vicinity of a room temperature. Treatment conditions such as the temperature of the $KNO_3$ molten salt, the immersion time, etc. may be set so that the surface compressive stress and the thickness of the compressive stress layer can reach desired values.

In the case where an organic glass, a synthetic resin or the like is used as the transparent substrate 2, the transparent substrate 2 may be formed of base materials put on top of one another regardless of whether the base materials belong to the same kind or different kinds. Various adhesive layers may be inserted among the base materials.

The ink for forming the semitransparent layer 71 may be an inorganic one or an organic one. For example, a pigment contained in the inorganic ink may have a composition containing at least one kind selected from the group consisting of $SiO_2$, ZnO, $B_2O_3$, $Bi_2O_3$, $Li_2O$, $Na_2O$, and $K_2O$; at least one kind selected from the group consisting of CuO, $Al_2O_3$, $ZrO_2$, $SnO_2$, and $CeO_2$; $Fe_2O_3$; and $TiO_2$.

As the organic ink, various printing materials in which a resin and a pigment have been dissolved in a solvent can be used. For example, as the resin, at least one kind may be selected and used from a group consisting of resins such as acrylic resin, urethane resin, epoxy resin, polyester resin, polyamide resin, vinyl acetate resin, phenolic resin, olefin, ethylene-vinyl acetate copolymer resin, polyvinyl acetal resin, natural rubber, styrene-butadiene copolymer, acrylonitrile-butadiene copolymer, polyester polyol, polyether polyurethane polyol, etc. As the solvent, water, alcohols, esters, ketones, aromatic hydrocarbon solvents, and aliphatic hydrocarbon solvents may be used. Examples of the alcohols include isopropyl alcohol, methanol, ethanol, etc. Examples of the esters include ethyl acetate, and examples of the ketones include methyl ethyl ketone. Examples of the aromatic hydrocarbon solvents include toluene, xylene, Solvesso® 100, Solvesso® 150, etc. Examples of the aliphatic hydrocarbon solvents include hexane, etc. Incidentally, these are examples, and various other printing materials may be used. The aforementioned organic printing material is applied to the transparent substrate 2, and the solvent is then evaporated. Thus, the semitransparent layer 71 of the resin can be formed. The ink may be a thermosetting ink which can be hardened by heating, or a UV-curable ink. The ink is not particularly limited.

The ink used for the semitransparent layer 71 may contain a pigment. As the pigment, a black pigment such as carbon black can be used in the case where the semitransparent layer 71 is made black. Further, a pigment of a suitable color can be used in accordance with a desired color.

The content ratio of the pigment in the semitransparent layer 71 may be changed desirably in accordance with a desired optical property. The content ratio of the content of the pigment to the total mass of the semitransparent layer 71 is preferably 0.01% to 10% by mass. The content ratio can be realized by adjustment of the ratio of the content of the pigment to the total mass of the ink.

The ink for forming the infrared ray-transmitting layer 3 may contain a pigment having infrared permeability in a photosetting resin or thermosetting resin. Either inorganic pigment or organic pigment may be used as the pigment. Examples of the inorganic pigment include iron oxide, titanium oxide, composite oxide pigments, etc. Examples of the organic pigment include metal complex pigments such as phthalocyanine pigments, anthraquinone pigments, and azo pigments, etc. It is preferable that the color of the infrared ray-transmitting layer 3 is the same as the color of the light-shielding layer 5. In the case where the light-shielding layer 5 is black, it is preferable that the infrared ray-transmitting layer 3 is also black.

In the case where the infrared ray-transmitting layer 3 is black, a black pigment can be used as the pigment, but it is preferable that the black color is expressed by use of a pigment of another color than black. This is because the use of the pigment of another color than black can impart an optical property with which visible light is sufficiently shielded but infrared light is sufficiently transmitted to the infrared ray-transmitting layer 3. Titanium black or carbon black can be used as the black pigment.

Examples of the pigment of another color than black which can be used in the infrared ray-transmitting layer 3 include red pigments, yellow pigments, blue pigments, green pigments, etc.

The red pigment may for example be a diketopyrrolopyrrole pigment, an anthraquinone pigment, or a perylene pigment. The yellow pigment may for example be an anthraquinone pigment or an isoindoline pigment. The blue pigment may for example be a copper phthalocyanine pigment or an anthraquinone pigment. The green pigment may for example be a phthalocyanine pigment or an isoindoline pigment.

It is preferable that at least three kinds of pigments different in color from one another are used in combination for the pigment of another color than black to be contained in the infrared ray-transmitting layer 3. This is for easiness of design for giving to the infrared ray-transmitting layer 3 the optical property with which visible light is sufficiently shielded but infrared light is sufficiently transmitted.

Examples of the photosetting resin or the thermosetting resin contained in the ink for forming the infrared ray-transmitting layer 3 include acrylic resins, epoxy resins, polyimide resins, etc. In addition, the ink for forming the infrared ray-transmitting layer 3 may contain a photopolymerization initiator, a photosensitizer, a dispersant, a surfactant, a stabilizer, a leveling agent, etc.

The content ratio of the infrared ray transmitting material in the infrared ray-transmitting layer 3 may be changed desirably in accordance with a desired optical property. The content ratio of the infrared ray transmitting material to the total mass of the infrared ray-transmitting layer 3 is preferably 0.01% to 20% by mass. The content ratio can be realized by adjustment of the ratio of the content of the infrared ray transmitting material to the total mass of the ink.

The ink for forming the light-shielding layer 5 may be an inorganic one or an organic one. For example, a pigment contained in the inorganic ink may be a composition containing at least one kind selected from the group consisting of $SiO_2$, $ZnO$, $B_2O_3$, $Bi_2O_3$, $Li_2O$, $Na_2O$, and $K_2O$; at least one kind selected from the group consisting of $CuO$, $Al_2O_3$, $ZrO_2$, $SnO_2$, and $CeO_2$; $Fe_2O_3$; and $TiO_2$.

As the organic ink, various printing materials in which a resin and a pigment have been dissolved in a solvent can be used. For example, as the resin, at least one kind may be selected and used from a group consisting of resins such as acrylic resin, urethane resin, epoxy resin, polyester resin, polyamide resin, vinyl acetate resin, phenolic resin, olefin, ethylene-vinyl acetate copolymer resin, polyvinyl acetal resin, natural rubber, styrene-butadiene copolymer, acrylonitrile-butadiene copolymer, polyester polyol, polyether polyurethane polyol, etc. As the solvent, water, alcohols, esters, ketones, aromatic hydrocarbon solvents, and aliphatic hydrocarbon solvents may be used. Examples of the alcohols include isopropyl alcohol, methanol, ethanol, etc. Examples of the esters include ethyl acetate, and examples of the ketones include methyl ethyl ketone. Examples of the aromatic hydrocarbon solvents include toluene, xylene, Solvesso® 100, Solvesso® 150, etc. Examples of the aliphatic hydrocarbon solvents include hexane, etc. Incidentally, these are examples, and various other printing materials may be used. The aforementioned organic printing material is subjected to application, and the solvent is evaporated. Thus, the light-shielding layer 5 of the resin can be formed. The ink may be a thermosetting ink which can be hardened by heating, or a UV-curable ink. The ink is not particularly limited.

The ink used for the light-shielding layer 5 may contain a pigment. As the pigment, a black pigment such as carbon black can be used in the case where the light-shielding layer 5 is made black. Further, a pigment of a suitable color can be used in accordance with a desired color.

Figure 6:
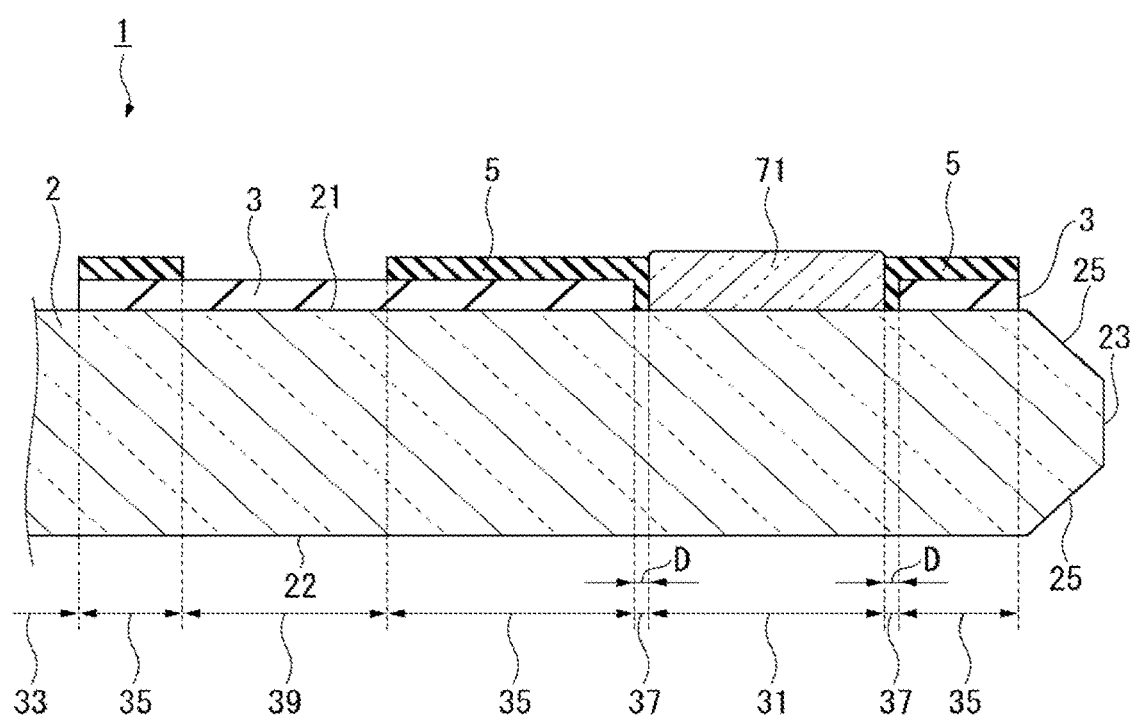
FIG. 6 is a sectional end view illustrating a transparent substrate with a light-shielding layer according to a modification embodiment of the present invention.

The light-shielding layer 5 may contain a desired number of layers laminated one another. For example, in FIG. 3, the light-shielding layer 5 has two layers. However, the light-shielding layer 5 may have one layer as illustrated in FIG. 6. In the case where the light-shielding layer 5 has two or more layers, different inks may be used for each of the layers.

The planar shape of the light-shielding layer 5 is not limited to the frame shape. The planar shape of the light-shielding layer 5 may be a linear shape extending along one side of the first main surface 21, an L-shape extending along two continuous sides of the first main surface 21, or two linear shapes extending along two opposing sides of the first main surface 21. In the case where the first main surface 21 has a polygonal shape other than a quadrangular shape, a circular shape or an atypical shape, the planar shape of the light-shielding layer 5 may be a frame shape corresponding to these shapes, a straight line shape extending along one side of the polygonal shape, or an arc shape extending along a part of the circular shape.

Figure 7:
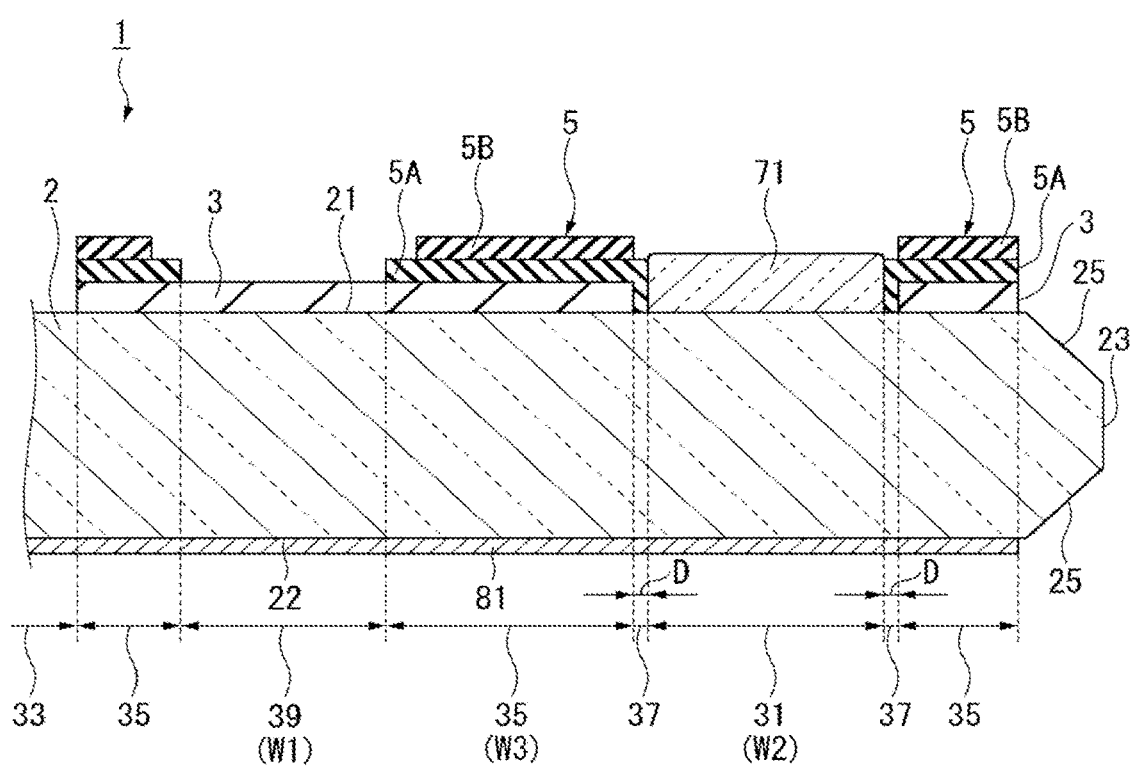
FIG. 7 is a sectional end view illustrating a transparent substrate with a light-shielding layer according to a modification embodiment of the present invention.

As illustrated in FIG. 7, a functional layer 81 including an antiglare layer, an antireflection layer, an antifouling layer, or the like may be provided on at least one of the first main surface 21 and the second main surface 22 of the transparent substrate 2.

Antiglare Layer:

In the case where an antiglare layer is provided as the functional layer 81, light incident from the second main surface 22 side can be scattered to reduce glare caused by the incident light. As a method for providing an antiglare property, a method for forming an irregular surface on the surface of the transparent substrate 2 may be used.

A known method can be applied to the method for forming an irregular surface. In the case where a glass substrate is used as the transparent substrate 2, it is possible to use a method in which a surface treatment is chemically or physically applied to the surface of the glass substrate to form an etching layer, thereby forming an irregular surface with desired surface roughness, or a method in which a coating layer such as an antiglare film is attached on the surface of the glass substrate.

The antiglare layer that is an etching layer is advantageous in that it is not necessary to coat the surface of the glass substrate with another material for antiglare. The antiglare layer that is a coating layer is advantageous in that antiglare property can be controlled easily owing to a selection of the material thereof.

A frost treatment can be exemplified as a method for chemically performing an antiglare treatment. The frost treatment can be performed, for example in such a manner that the glass substrate as an object to be treated is dipped in a mixed solution of hydrogen fluoride and ammonium fluoride. As a method for physically performing an antiglare treatment, it is, for example, possible to use a sandblasting process in which crystalline silicon dioxide powder, silicon carbide powder or the like is blown toward a main surface of the glass substrate by pressurized air, a method in which the main surface of the glass substrate is rubbed with a brush attached with crystalline silicon dioxide powder, silicon carbide powder or the like and wet with water, etc.

In the surface of the transparent substrate 2 including the antiglare layer, surface roughness (root mean square roughness, RMS) is preferably 0.01 µm to 0.5 µm. This is in order that light incident from the second main surface 22 side can be scattered more surely. The surface roughness (RMS) is more preferably 0.01 µm to 0.3 µm, and even more preferably 0.02 µm to 0.2 µm. In the case where the surface roughness (RMS) is set within the aforementioned range, a haze value of the transparent substrate with the antiglare layer can be adjusted to be 1% to 30%. Incidentally, the haze value is stipulated in JIS K 7136(2000).

Antireflection Layer:

In the case where the functional layer 81 has an antireflection layer, the antireflection layer is provided on the second main surface 22 side. Accordingly, reflection of light incident from the second main surface 22 side can be prevented, and glare caused by the incident light can be prevented.

In the case where the functional layer 81 is an antireflection layer, it is preferable that the antireflection layer has a laminated structure in which a high-refractive index layer having a refractive index of 1.9 or higher with respect to light having a wavelength of 550 nm and a low-refractive index layer having a refractive index of 1.6 or lower with respect to light having a wavelength of 550 nm are laminated. Since the antireflection layer has the structure in which the high-refractive index layer and the low-refractive index layer are laminated, reflection of visible light can be prevented more surely.

The antireflection layer may have a configuration including one high-refractive index layer and one low-refractive index layer. However, the antireflection layer may have a configuration including two or more high-refractive index layers and two or more low-refractive index layers. In the configuration including one high-refractive index layer and one low-refractive index layer, it is preferable that the high-refractive index layer and the low-refractive index layer are laminated in this order on the second main surface 22 of the transparent substrate 2. In the configuration including two or more high-refractive index layers and two or more low-refractive index layers, a laminate in which the high-refractive index layers and the low-refractive index layers are laminated alternately in this order is preferable. The total number of layers in the laminate is preferably 2 or more and 8 or less, more preferably 2 or more and 6 or less, and even more preferably 2 or more and 4 or less. In addition, another layer may be added as long as it does not spoil the optical property. For example, an $SiO_2$ film may be inserted between the glass and the first layer of the laminate in order to prevent diffusion of Na from the glass substrate.

Materials forming the high-refractive index layer and the low-refractive index layer are not particularly limited, and may be selected in consideration of a required degree of antireflection, or required productivity. Examples of the material forming the high-refractive index layer include niobium oxide ($Nb_2O_5$), titanium oxide ($TiO_2$), zirconium oxide ($ZrO_2$), tantalum oxide ($Ta_2O_5$), aluminum oxide ($Al_2O_3$), silicon nitride (SiN), etc. At least one kind selected from those materials can be preferably used. Examples of the material forming the low-refractive index layer include silicon oxide (particularly, $SiO_2$), a material containing a mixed oxide of Si and Sn, a material containing a mixed oxide of Si and Zr, a material containing a mixed oxide of Si and Al, etc. At least one kind selected from those materials can be preferably used.

The antireflection layer can be formed preferably by a method for forming an inorganic thin film directly on the surface, a method for performing a surface treatment in a manner of etching or the like, a dry method such as a chemical vapor deposition (CVD) method or a physical vapor deposition (PVD) method, particularly by a vacuum deposition method or a sputtering method which are a kind of physical vapor deposition method.

The thickness of the antireflection layer is preferably 100 nm to 500 nm. It is preferable that the thickness of the antireflection layer is made not less than 100 nm because reflection of external light can then be effectively suppressed.

It is preferable that the antireflection layer has a* of −6 to 1 and b* of −8 to 1 in CIE (International Commission on Illumination) color difference system.

In the case where the antireflection layer is −6 to 1 in a* and −8 to 1 in b*, the antireflection layer is not likely to be a "danger" color (warning color). Also, the color of the antireflection layer can be prevented from being conspicuous.

Antifouling Layer:

In the case where an antifouling layer is provided as the functional layer 81, adhesion of dirt such as a fingerprint, sebum, sweat, etc. to the second main surface 22 can be reduced even if a finger of a human being touches the second main surface 22.

As a method for forming the antifouling layer, it is possible to use a vacuum deposition method (dry method) in which a fluorine-containing organic compound or the like is evaporated in a vacuum tank and attached to the surface of the antireflection layer, a method (wet method) in which a fluorine-containing organic compound or the like is dissolved in an organic solvent, adjusted to have a predetermined density, and applied to the surface of the antireflection layer, etc.

Examples of the dry method include an ion beam assist deposition method, an ion plate method, a sputtering method, and a plasma CVD method. Example of the wet method include a spin coat method, a dip coat method, a cast method, a slit coat method, and a spray coat method. Either the dry method or the wet method may be used. From the viewpoint of excoriation resistance, it is preferred to use a dry film forming method.

A material forming the antifouling layer can be suitably selected from fluorine-containing organic compounds and the like, which can provide an antifouling property, a water repellent property and an oil repellent property. Specifically, fluorine-containing organic silicon compounds and fluorine-containing hydrolyzable silicon compounds can be exemplified. Any fluorine-containing organic compound can be used without special limitation as long as it can provide the antifouling property, water repellent property and oil repellent property.

In the case where an antireflection layer is formed on a main surface of the transparent substrate or on a treated surface of the antiglare layer, it is preferable that a coating of the fluorine-containing organic silicon compound forming the antifouling layer is formed on the surface of the antireflection layer. In the case where a glass substrate which is subjected to a surface treatment such as an antiglare treatment or a chemical strengthening treatment and on which the antireflection layer is not formed is used as the transparent substrate, it is preferable that a coating of the fluorine-containing organic silicon compound is formed directly on the surface having been subjected to the surface treatment.

Examples of a method for forming a coating of a fluorine-containing organic silicon compound include a method in which a composition of a silane coupling agent containing a fluoroalkyl group such as a perfluoroalkyl group or a fluoroalkyl group including a perfluoro(polyoxyalkylene) chain is applied by a spin coat method, a dip coat method, a cast method, a slit coat method, a spray coat method or the like, and then a heating treatment is performed thereon; a vacuum deposition method in which a fluorine-containing organic silicon compound is vapor-deposited, and then a heating treatment is performed thereon; etc. In order to obtain a fluorine-containing organic silicon compound coating high in adhesion, it is preferable to form the coating by the vacuum deposition method. In the case where the fluorine-containing organic silicon compound coating is formed by the vacuum deposition method, it is preferable to use a composition which contains a fluorine-containing hydrolyzable silicon compound, for coating.

In the antifouling layer, the fluorine-containing hydrolyzable silicon compound used for forming a fluorine-containing organic silicon compound coating is not particularly limited as long as the fluorine-containing organic silicon compound coating obtained has an antifouling property such as water repellency or oil repellency. Specifically, a fluorine-containing hydrolyzable silicon compound containing at least one group selected from a group consisting of a perfluoropolyether group, a perfluoroalkylene group and a perfluoroalkyl group can be exemplified.

The layer thickness of the antifouling layer is not particularly limited, but it is preferably 2 nm to 20 nm, more preferably 2 nm to 15 nm, and even more preferably 3 nm to 10 nm. In the case where the layer thickness is 2 nm or more, the surface of the antireflection layer can be covered with the antifouling layer uniformly to possibly withstand in practical use in terms of excoriation resistance. On the other hand, in the case where the layer thickness is 20 nm or less, optical properties such as a luminous transmittance and a haze value are excellent in the state where the antifouling layer has been laminated.

The functional layer 81 is not limited to a single layer of the antiglare layer, the antireflection layer, or the antifouling layer. Two or more kinds of functional layers may be laminated. A protective layer may be provided as well on the functional layer 81.

Priming or etching may be performed on the first main surface 21 and the chamfered portion 25 in order to improve the adhesion to the infrared ray-transmitting layer 3 and the light-shielding layer 5.

The semitransparent layer 71 does not have to be always provided. For example, a configuration in which the semitransparent layer 71 is not provided in the visible light-transmitting region 31 may be used as illustrated in FIG. 3, or a configuration in which the semitransparent layer 71 is provided in the visible light-transmitting region 31 may be used as illustrated in FIG. 8.

The transparent substrate with light-shielding layer 1 of the present invention can be used as a cover member for a display device such as a cover glass for a panel display such as a liquid crystal display or an organic EL display, for an on-vehicle information apparatus, or for a portable apparatus. In the case where the transparent substrate with light-shielding layer 1 of the present invention is used as a cover member for a display device, it is possible to protect the covered device while securing visibility. Particularly since the difference in color between the infrared ray-transmitting layer 3 and the light-shielding layer 5 can be reduced, the transparent substrate with light-shielding layer 1 of the present invention is useful for an apparatus whose appearance is important, such as an on-vehicle information apparatus for a luxury car.

In the case where the transparent substrate with light-shielding layer 1 is used for a display device, it is preferable that the infrared ray-transmitting layer 3 and the light-shielding layer 5 have a color corresponding to the color of the display device in a non-display state. For example, in the case where the color in the non-display state is a black color, the colors of the infrared ray-transmitting layer 3 and the light-shielding layer 5 are preferably also a black color.

The infrared ray-transmitting layer 3 and the light-shielding layer 5 may constitute a pattern of an article to which the transparent substrate with light-shielding layer 1 is applied, so as to improve the design property of the article.

Here, description will be made about an example of a display device provided with the transparent substrate with light-shielding layer 1.

Figure 9:
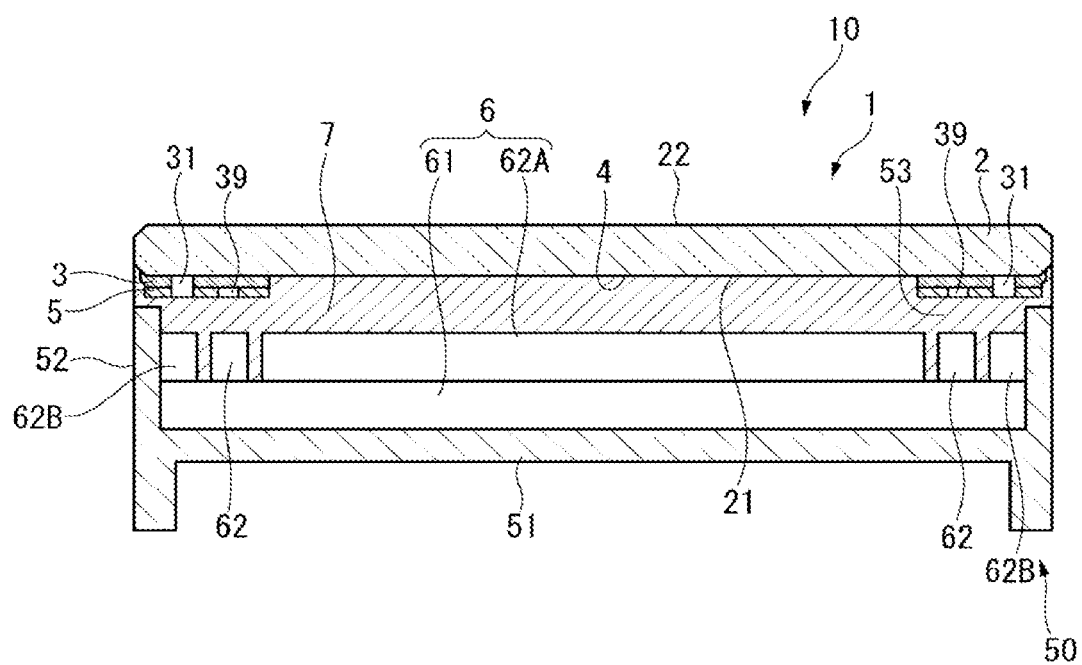
FIG. 9 is a partially sectional end view of a display device provided with a transparent substrate with a light-shielding layer according to an embodiment of the present invention.

A display device 10 illustrated in FIG. 9 has a frame 50. The frame 50 has a bottom portion 51, a side wall portion 52 crossing the bottom portion 51, and an opening portion 53 opposed to the bottom portion 51. A liquid crystal module 6 is disposed in a space surrounded by the bottom portion 51 and the side wall portion 52. The liquid crystal module 6 has a backlight 61 disposed on the bottom portion 51 side, liquid crystal panels 62A and 62B (display panels) disposed on the backlight 61, and an infrared sensor 62 provided on the backlight 61. Incidentally, the liquid crystal panel (display panel) 62B used on the back surface of the visible light-transmitting region 31 may be replaced by a light emitting device such as an LED.

The transparent substrate with light-shielding layer 1 is provided on the top of the frame 50 so that the first main surface 21 faces on the liquid crystal module 6 side. For the transparent substrate with light-shielding layer 1, a part of the light-shielding layer 5 is bonded on the frame 50 and another part of the light-shielding layer 5 and the display portion 4 of the first main surface 21 are bonded on the liquid crystal module 6, through an adhesive layer 7 provided in the opening portion 53 and on the top surface of the side wall portion 52.

The liquid crystal panel 62A is provided to be opposed to the display portion 4. The liquid crystal panel 62B is provided to be opposed to the visible light-transmitting region 31. The infrared sensor 62 is provided to be opposed to the infrared ray-transmitting region 39. In the case where the visible light-transmitting region 31 has a planar shape corresponding to a logo mark of a manufacturer, the visible light-transmitting region 31 may be disposed to be opposed to the backlight 61 without the liquid crystal therebetween.

It is preferable that the adhesive layer 7 is transparent and small in difference of refractive index from the transparent substrate 2.

As the adhesive layer 7, it is, for example, possible to use a layer made of a transparent resin obtained by curing a liquid curable resin composition. Examples of the curable resin composition include a photosetting resin composition, a thermosetting resin composition, etc. Among them, a photosetting resin composition containing a curable compound and a photopolymerization initiator is preferred. The curable resin composition is, for example, applied by a method such as a die coater or a roll coater to form a curable resin composition film.

The adhesive layer 7 may be an optical clear adhesive film (OCA film or OCA tape). In this case, the OCA film may be bonded on the first main surface 21 side of the transparent substrate with light-shielding layer 1.

The thickness of the adhesive layer 7 is preferably 5 µm or more and 400 µm or less, and more preferably 50 µm or more and 200 µm or less. The shear storage modulus of the adhesive layer 7 is preferably 5 kPa or more and 5 MPa or less, and more preferably 1 MPa or more and 5 MPa or less.

The sequence of assembly for manufacturing the display device 10 is not particularly limited. For example, the following sequence may be used. That is, a structure in which the adhesive layer 7 has been disposed on the transparent substrate with light-shielding layer 1 is prepared in advance, and disposed on the frame 50. After that, the liquid crystal module 6 is bonded.

The display device 10 may have a touch sensor and the like. In the case where a touch sensor is incorporated, the touch sensor is disposed on the first main surface 21 side of the transparent substrate with light-shielding layer 1 through another not-illustrated adhesive layer, and the liquid crystal module 6 is disposed thereon through the adhesive layer 7.

Incidentally, in FIG. 9, the liquid crystal panel 62A, the liquid crystal panel 62B and the infrared sensor 62 are bonded together by the adhesive layer 7. However, the present invention is not limited thereto. The adhesive layer 7 may be selected suitably in consideration of optical properties of the liquid crystal panel 62A, the liquid crystal panel 62B and the infrared sensor 62. In addition, the liquid crystal panel 62A, the liquid crystal panel 62B and the infrared sensor 62 do not have to have the same distance (bonding thickness) from the transparent substrate with a light-shielding layer.

EXAMPLES

Next, examples of the present invention will be described. The present invention is not limited to the following examples.

Production of Transparent Substrate with Light-Shielding Layer:

First, transparent substrates with a light-shielding layer in Examples 1 to 8 were produced in the following procedure. In the following description, Examples 1 to 5 are inventive examples each having a structure illustrated in FIG. 7. Example 6 is a comparative example having a structure illustrated in FIG. 10. Example 7 is a comparative example having a structure illustrated in FIG. 11. Example 8 is a comparative example having a structure illustrated in FIG. 7.

Example 1

A sheet-like glass (Dragontrail®, made by Asahi Glass Co., Ltd.) having a thickness of 1 mm and having a rectangular main surface measuring 200 mm by 250 mm was used as the transparent substrate 2. The glass substrate was subjected to (1) antiglare treatment, (2) grinding of the end faces, (3) chemical strengthening treatment and alkali treatment, (4) formation of the infrared ray-transmitting layer 3, (5) formation of the light-shielding layer 5, and (6) formation of the semitransparent layer 71, sequentially. Each specific treatment will be described below.

(1) Antiglare Treatment

Antiglare treatment by frost treatment was performed on the second main surface 22 of the glass substrate in the following procedure so as to provide an antiglare layer as the functional layer 81.

First, an acid resistant protective film (hereinafter referred to as "protective film" simply) was bonded on the main surface (first main surface 21) of the glass substrate where the antiglare treatment will not be performed. The glass substrate was immersed in a solution containing 3 mass % of hydrogen fluoride for 3 minutes. Then, the glass substrate was etched, and dirt adhering to the second main surface 22 of the glass substrate was removed. Successively, the glass substrate was immersed in a mixed solution containing 15 mass % of hydrogen fluoride and 15 mass % of potassium fluoride for 3 minutes to perform the frost treatment on the second main surface 22 of the glass substrate. After that, the glass substrate was immersed in a solution containing 10 mass % of hydrogen fluoride for 6 minutes to perform the antiglare treatment. The protective film was removed from the glass substrate, and the haze value of the glass substrate was measured. The measured haze value was 25%. Incidentally, the haze value was measured by a haze meter (trade name: HZ-V3, made by Suga Test Instruments Co., Ltd.) in accordance with JIS K 7136.

(2) Grinding of End Face

C-chamfering was performed with a width of 0.2 mm from the end face of the glass to all over the circumference of the glass substrate having been subjected to the antiglare treatment. The chamfering was performed by using a #600 grindstone (made by Tokyo Diamond Tools Mfg. Co., Ltd.) with the grindstone set at a rotational frequency of 6,500 rpm and a moving speed of 5,000 mm/min. Thus, the end face had an arithmetic surface roughness Ra of 450 nm.

(3) Chemical Strengthening Treatment and Alkali Treatment

Next, potassium nitrate was heated to 450° C. and melted, and the glass substrate was immersed in the molten salt for 2 hours to perform chemical strengthening treatment. After that, the glass substrate was lifted up from the molten salt, and gradually cooled down to a room temperature for one hour. As a result of the aforementioned treatment, obtained was a chemically strengthened glass substrate having a surface compressive stress (CS) of 730 MPa and a depth of stress layer (DOL) of 30 µm.

Further, the glass substrate was immersed in an alkali solution (trade name: Sunwash TL-75, made by Lion Corporation) for 4 hours, so as to be subjected to alkali treatment.

(4) Formation of Infrared Ray-Transmitting Layer 3

HF GV3 RX01 IR ink (hereinafter abbreviated to "IR1") made by Seiko advance Ltd. was applied to an outer peripheral portion of the first main surface 21 of the glass substrate by use of a screen printing sheet. The applied ink was dried at 150° C. for 60 minutes to be hardened. Thus, the infrared ray-transmitting layer 3 was formed into a frame-like shape with a width of 40 mm, an outer peripheral size for length and breadth of 150 mm by 200 mm (printed substantially along the outline of the substrate) and an average thickness of 3 μm.

(5) Formation of Light-Shielding Layer 5

HF GV3 RX01 710 (hereinafter abbreviated to "Black 1") made by Seiko advance Ltd. was applied to the infrared ray-transmitting layer 3 by use of a screen printing sheet. The applied ink was dried at 150° C. for 60 minutes to be hardened. Thus, the light-shielding layer 5 was formed. The light-shielding layer 5 was set to have two layers, which were formed so that the total thickness of the two layers was 3 μm in average thickness. On this occasion, the inner circumferential surrounding region 37 was formed to have a width D of 200 μm.

(6) Formation of Semitransparent Layer 71

HF GV3 RX01 JN614 (hereinafter abbreviated to "Semitransparent 1") made by Seiko advance Ltd. was applied to the visible light-transmitting region 31 by use of a screen printing sheet. The applied ink was dried at 150° C. for 60 minutes to be hardened. Thus, the semitransparent layer 71 was formed with an average thickness of 3 μm.

Through the aforementioned steps, the transparent substrate with light-shielding layer 1 illustrated in FIG. 7 was produced. In the surface direction of the second main surface 22, width W1 of the infrared ray-transmitting region 39 was set at 8 mm, width W2 of the visible light-transmitting region 31 was set at 8 mm, and width W3 of the light-shielding region 35 between the infrared ray-transmitting region 39 and the visible light-transmitting region 31 was set at 10 mm.

Example 2

A transparent substrate with light-shielding layer 1 was produced on the same conditions as in Example 1, except that IRX-HF 40512 (hereinafter abbreviated to "IR2") made by Teikoku Printing Inks Mfg. Co., Ltd. was used for the infrared ray-transmitting layer 3, and HF GV3 RX01 KF857 (hereinafter abbreviated to "Semitransparent 2") made by Seiko advance Ltd. was used for the semitransparent layer 71.

Example 3

A transparent substrate with light-shielding layer 1 was produced on the same conditions as in Example 1, except that IRX-HF 40552 (hereinafter abbreviated to "IR3") made by Teikoku Printing Inks Mfg. Co., Ltd. was used for the infrared ray-transmitting layer 3, and "Semitransparent 2" was used for the semitransparent layer 71.

Example 4

A transparent substrate with light-shielding layer 1 was produced on the same conditions as in Example 1, except that the width D of the inner circumference-surrounding region 37 was set at 400 μm.

Example 5

A transparent substrate with light-shielding layer 1 was produced on the same conditions as in Example 1, except that the width D of the inner circumference-surrounding region 37 was set at 500 μm.

Example 6

Figure 10:
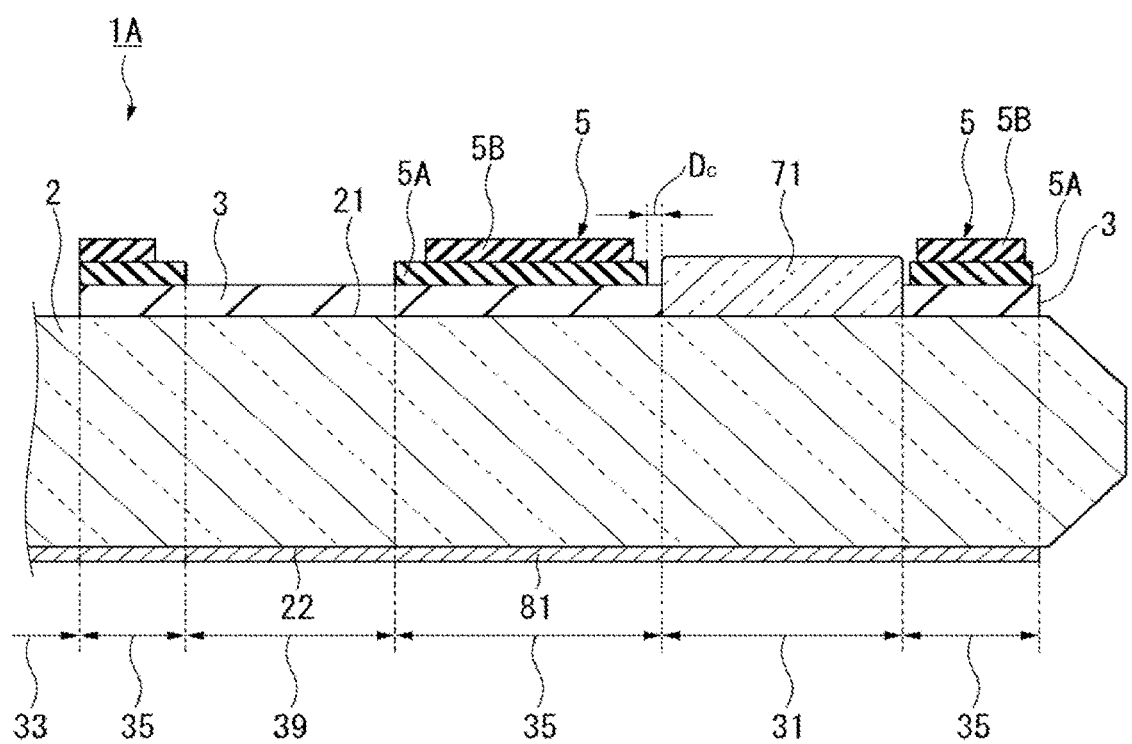
FIG. 10 is a partially sectional end view of a transparent substrate with a light-shielding layer according to Example 6 (Comparative Example).

A transparent substrate with light-shielding layer 1A was produced on the same conditions as in Example 1, except that the inner circumference-surrounding region 37 was not provided and instead the infrared ray-transmitting layer 3 and the semitransparent layer 71 were in contact with each other as illustrated in FIG. 10. The infrared ray-transmitting layer 3 was configured so that the part in contact with the semitransparent layer 71 was exposed over the 200 μm from the light-shielding layer 5 in the surface direction of the first main surface 21 (exposed over width $D_c$ corresponding to the width of the inner circumference-surrounding region 37).

Example 7

Figure 11:
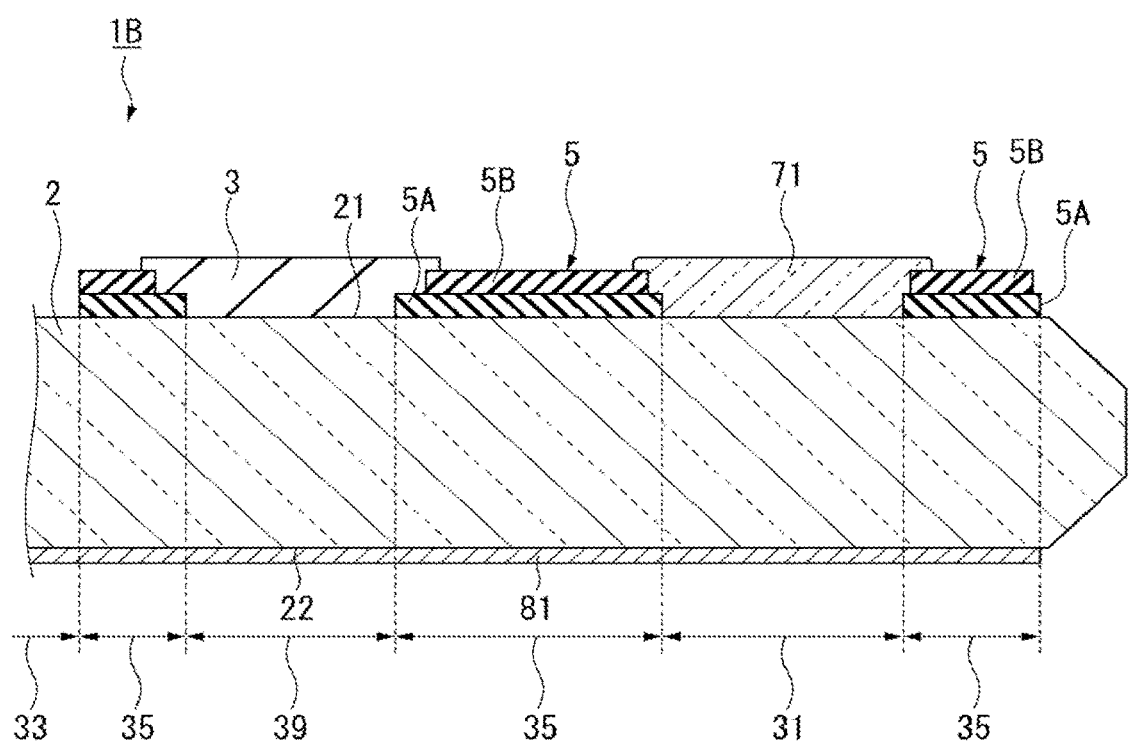
FIG. 11 is a partially sectional end view of a transparent substrate with a light-shielding layer according to Example 7 (Comparative Example).

A transparent substrate with light-shielding layer 1B was produced on the same conditions as in Example 1, except that the light-shielding layer 5 was formed directly on the first main surface 21, and the infrared ray-transmitting layer 3 was provided only in and around the infrared ray-transmitting region 39 as illustrated in FIG. 11.

Example 8

A transparent substrate with light-shielding layer 1 was produced on the same conditions as in Example 1, except that the width D of the inner circumference-surrounding region 37 was set at 1,500 μm.

Evaluation of Transparent Substrate with Light-Shielding Layer:

Next, the produced transparent substrate with light-shielding layer 1, 1A and 1B were evaluated as follows.

[1] Luminous Transmittance

A transmission spectrum was measured in a wavelength range of 380 nm to 780 nm by a spectrophotometer (SolidSpec 3700, made by Shimadzu Corporation), and luminous transmittance of the infrared ray-transmitting region 39 was derived from the transmission spectrum in accordance with JIS Z 8722:2009.

[2] Infrared Ray Transmittance

A transmission spectrum was measured by the spectrophotometer (SolidSpec 3700, made by Shimadzu Corporation). The wavelength range was set to 800 nm to 1,000 nm, and the measuring interval was set at 5 nm. From values measured thus, a minimum value of infrared ray transmittance in the infrared ray-transmitting region 39 and a maximum value of infrared ray transmittance in the visible light-transmitting region 31 were obtained.

[3] Reflectivity of Light-Shielding Region 35

Average reflectivity with respect to light within a wavelength range of 400 nm to 600 nm and average reflectivity with respect to light within a wavelength range of 600 nm to 700 nm were measured. A spectral colorimeter (CM-2600d made by Konica Minolta, Inc.) was used as a measuring apparatus to measure a reflection spectrum. The measuring mode was set as SCI mode. From the measured reflection spectrum, reflectivity was derived using Equation (1) and Equation (2). The wavelength interval was set at 10 nm. Ratios between measured reflectivities were obtained.

$$\text{reflectivity } RA = \text{reflectivity } RB + \text{reflectivity } RB(1-\text{reflectivity } RB)^2 \quad (1)$$

$$\text{reflectivity } RC = \text{reflectivity } RB + \text{reflectivity } RD(1-\text{reflectivity } RB)^2 \quad (2)$$

Here,

RA: a measured value of reflectivity with respect to light incident on the visible light-transmitting region 31 from the second main surface 22 side RB: reflectivity of the second main surface 22 (reflectivity between the transparent substrate 2 and the air on the first main surface 21 side)

RC: a measured value of reflectivity with respect to light incident on the light-shielding region 35 from the second main surface 22 side RD: reflectivity at the interface between the infrared ray-transmitting layer 3 and the transparent substrate 2 in the light-shielding region 35

RA and RC were measured values, and RB was already known as a characteristic of the base material. Therefore, RD could be obtained. The obtained RD was regarded as reflectivity in the light-shielding region, and a ratio of the RD at a wavelength of 600 nm to 700 nm to the RD at a wavelength of 400 nm to 600 nm was obtained as reflectivity ratio.

[4] Optical Density (OD Value)

Optical density was measured by use of a black and white transmission densitometer (trade name: Ihac-T5, made by IHARA Electronic Industries Co., Ltd.), and an OD value was calculated using Equation (A).

$$OD = |\text{Log}_{10}(Ta/I)| \quad (A)$$

Here,

I: incident light quantity

Ta: transmitted light quantity

[5] Difference in Color Between Infrared Ray-Transmitting Region 39 and Light-Shielding Region 35

A transparent substrate with a light-shielding layer and a liquid crystal display were bonded by a bonding agent. Trade name: TD06 made by Tomoegawa Co., Ltd. was used as the bonding agent. The thickness of the bonding agent was set at 50 μm.

After that, in a state where the display was OFF, an operator observed the infrared ray-transmitting region 39 and the light-shielding region 35. In the case where a difference in color was not visually recognized, it was evaluated as good. In the case where a difference in color was visually recognized, it was evaluated as not good.

[6] Blur in Boundary of Visible Light-Transmitting Region 31

The display was powered on to emit white light. After that, an operator observed the boundary region (inner circumference) of the visible light-transmitting region 31. In the case where the boundary was seen as double, seen with a black outline, or seen as jagged, it was evaluated as not good. In the case where the boundary was seen as a clear straight line, it was evaluated as good.

The above results are shown in Table 1.

TABLE 1

| | Sample name | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Light-shielding region | First layer | IR1 | IR2 | IR3 | IR1 | IR1 | IR1 | Black1 | IR1 |
| | Second layer | Black1 | Black1 | Black1 | Black1 | Black1 | Black1 | Black1 | Black1 |
| | Third layer | Black1 | Black1 | Black1 | Black1 | Black1 | Black1 | IR1 | Black1 |
| | Visible light-transmitting region | Semi-transparent 1 | Semi-transparent 2 | Semi-transparent 2 | Semi-transparent 1 | Semi-transparent 1 | Semi-transparent 1 | Semi-transparent 1 | Semi-transparent 1 |
| | Inner circumference-surrounding region | Black1 | Black1 | Black1 | Black1 | Black1 | Nothing (IR1) | Nothing | Black1 |
| | Width D of inner circumference-surrounding region | 200 μm | 200 μm | 200 μm | 400 μm | 500 μm | (200 μm) | 0 | 1500 μm |
| | Luminous transmittance of infrared ray-transmitting region | 0.80% | 1% | 25% | 0.80% | 0.80% | 0.80% | 0.80% | 0.80% |
| | Infrared ray transmittance (minimum value) of infrared ray-transmitting region | 75% | 80% | 82% | 75% | 75% | 75% | 75% | 75% |
| | Infrared ray transmittance (maximum value) of visible light-transmitting region | 20% | 30% | 40% | 20% | 20% | 20% | 20% | 20% |
| | OD value of light-shielding region | 4.2 | 4.2 | 4.2 | 4.2 | 4.2 | 4.2 | 4.2 | 4.2 |
| | Reflectivity ratio in light-shielding region | 2.1 | 3.3 | 6.4 | 2.1 | 2.1 | 2.1 | 1.1 | 2.1 |
| | Difference in color between infrared ray-transmitting region and light-shielding region | Good | Good | Good | Good | Good | Good | Not good | Good |
| | Blur in boundary of visible light-transmitting region | Good | Good | Good | Good | Good | Not good | Good | Not good (outline looks black) |

As shown in Table 1, Examples 1 to 5 were evaluated as good with respect to both the difference in color and the blur in the boundary.

More in detail, comparison was made among Example 1, Example 2 and Example 3, which used different materials for the infrared ray-transmitting layer 3 and the light-shielding layer 5 but had the same dimensions. On those conditions, the samples were evaluated as good when the luminous transmittance in the infrared ray-transmitting region 39 with respect to visible light was 0.1% to 50%, the minimum value of the infrared ray transmittance was 70% or higher, and the OD value of the light-shielding region 35 was larger than 4. As more preferable ranges, the luminous transmittance in the infrared ray-transmitting region 39 with respect to visible light was 0.8% to 25%, the minimum value of the infrared ray transmittance was 75% or higher, and the reflectivity ratio in the light-shielding region 35 was 1.5 or more.

Comparison was made among Example 1, Example 4, and Example 5, which used the same materials for the infrared ray-transmitting layer 3 and the light-shielding layer 5. On those conditions, the samples were evaluated as good when the width D of the inner circumference-surrounding region 37 was 100 µm to 1,000 µm. The width D was more preferably 200 µm to 500 µm.

Example 6 was not good with respect to blur. It can be considered that due to the configuration in which the infrared ray-transmitting layer 3 was in contact with the semitransparent layer 71, a slight volume of visible light was transmitted through the infrared ray-transmitting layer 3 (a part illustrated by $D_c$ in FIG. 10) near the boundary with the semitransparent layer 71 so that the boundary was seen to be blurred.

Example 7 was not good with respect to the difference in color. It can be considered that since the light-shielding layer 5 was formed directly on the first main surface 21, the difference in color caused by a difference in material between the part where only the light-shielding layer 5 was provided and the part where only the infrared ray-transmitting layer 3 was provided was seen conspicuous. In Example 7, the reflectivity ratio in the light-shielding region 35 was also less than 1.5. It can be considered that this is because the light-shielding layer 5 was formed directly on the first main surface 21.

Example 8 was evaluated as not good with respect to blur. Specifically, the inner circumference-surrounding region 37 looked black, seeming to follow the outline of the semitransparent layer 71. It can be considered that the width D was so large that the difference in color between the inner circumference-surrounding region 37 and the infrared ray-transmitting layer 3 was seen conspicuous.

From the above results, as in Examples 1 to 5, it has been proved that owing to the configuration in which the inner circumference of the visible light-transmitting region 31 is covered with the light-shielding layer 5, the circumference of the visible light-transmitting region 31 can be prevented from being blurred. It has been also proved that in the case where the infrared ray-transmitting layer 3 and the light-shielding layer 5 are provided on the first main surface 21 of the transparent substrate 2 in this order, the difference in color between the infrared ray-transmitting region 39 and the light-shielding region 35 can be made inconspicuous.

The present application is based on Japanese Patent Application (No. 2018-026793) filed on Feb. 19, 2018, and the entirety of which is incorporated by reference.

REFERENCE SIGNS LIST 1 transparent substrate with light-shielding layer,
2 transparent substrate,
3 infrared ray-transmitting layer,
5 light-shielding layer,
10 display device,
21 first main surface,
22 second main surface,
23 end face,
25 chamfered portion,
31 visible light-transmitting region,
35 light-shielding region,
37 inner circumference-surrounding region,
39 infrared ray-transmitting region,
71 semitransparent layer,
81 functional layer

What is claimed is:

1. A transparent substrate with a light-shielding layer comprising:
   the transparent substrate having a first main surface and a second main surface;
   an infrared ray-transmitting layer that is on the first main surface and forms a visible light-transmitting region that is an opening in a top view from the first main surface side; and
   the light-shielding layer that is on the infrared ray-transmitting layer and forms an infrared ray-transmitting region that is an opening to expose the infrared ray-transmitting layer in the top view from the first main surface side,
   wherein:
   the light-shielding layer comprises a region having a width of 100 µm to 1,000 µm, surrounding an inner circumference of the visible light-transmitting region and contacting with the first main surface in a top view from the second main surface side;
   the infrared ray-transmitting region has a luminous transmittance of 0.1% to 50% measured from the second main surface side with respect to a light having a wavelength of 380 nm to 780 nm, and has the minimum transmittance of 70% or higher measured from the second main surface side with respect to a light having a wavelength of 800 nm to 1,000 nm; and
   an overlapping region where the transparent substrate, the infrared ray-transmitting layer, and the light-shielding layer overlap with one another in the top view from the second main surface side has an optical density of 4 or more in OD value measured from the second main surface side.

2. The transparent substrate with a light-shielding layer according to claim 1, comprising a semitransparent layer in the visible light-transmitting region,
   wherein the visible light-transmitting region has a luminous transmittance of 10% to 50% measured from the second main surface side with respect to the light having the wavelength of 380 nm to 780 nm, and has the maximum transmittance of lower than 70% measured from the second main surface side with respect to the light having the wavelength of 800 nm to 1,000 nm.

3. The transparent substrate with a light-shielding layer according to claim 1, wherein the visible light-transmitting region has a shape corresponding to a character, a figure or a symbol in the top view from the second main surface side.

4. The transparent substrate with a light-shielding layer according to claim 1, wherein the transparent substrate is a chemically strengthened glass.

5. The transparent substrate with a light-shielding layer according to claim 1, wherein the transparent substrate is a bent glass.

6. The transparent substrate with a light-shielding layer according to claim 1, further comprising an antiglare layer on the second main surface side.

7. The transparent substrate with a light-shielding layer according to claim 6, wherein the antiglare layer is an etching layer or a coating layer.

8. The transparent substrate with a light-shielding layer according to claim 6, wherein the antiglare layer has a surface roughness of 0.01 μm to 0.5 μm in root mean square roughness.

9. The transparent substrate with a light-shielding layer according to claim 1, further comprising an antireflection layer on the second main surface side.

10. The transparent substrate with a light-shielding layer according to claim 9, wherein the antireflection layer comprises a laminated structure of a high-refractive index layer having a refractive index of 1.9 or higher with respect to a light having a wavelength of 550 nm and a low-refractive index layer having a refractive index of 1.6 or lower with respect to the light having the wavelength of 550 nm.

11. The transparent substrate with a light-shielding layer according to claim 9, wherein the antireflection layer has an a* of −6 to 1 and a b* of −8 to 1 in the CIE color difference system.

12. The transparent substrate with a light-shielding layer according to claim 1, further comprising an antifouling layer on the second main surface side.

13. The transparent substrate with a light-shielding layer according to claim 1, wherein the overlapping region has a ratio of an average reflectivity with respect to a light having a wavelength of 600 nm to 700 nm to an average reflectivity with respect to a light having a wavelength of 400 nm to 600 nm, being 1.5 or more.

* * * * *